US012777071B2

(12) United States Patent
Van Hooser et al.

(10) Patent No.: US 12,777,071 B2
(45) Date of Patent: Oct. 27, 2026

(54) DUAL RELAY SYSTEM AND METHODS FOR SECURELY TRANSLATING AMONG COMMUNICATION PROTOCOLS

(71) Applicant: QuSecure, Inc, San Mateo, CA (US)

(72) Inventors: Barry Van Hooser, Pleasanton, CA (US); Konstantin Vilk, Belmont, CA (US); Mark Reynolds, Concord, MA (US); Oleg Syrel, San Jose, CA (US)

(73) Assignee: QUSECURE, INC, Petaluma, CA (US)

( * ) Notice: Subject to any disclaimer, the term of this patent is extended or adjusted under 35 U.S.C. 154(b) by 78 days.

(21) Appl. No.: 18/837,041

(22) PCT Filed: Apr. 27, 2022

(86) PCT No.: PCT/US2022/026555
§ 371 (c)(1),
(2) Date: Aug. 8, 2024

(87) PCT Pub. No.: WO2023/154074
PCT Pub. Date: Aug. 17, 2023

(65) Prior Publication Data

US 2025/0141923 A1 May 1, 2025

Related U.S. Application Data

(60) Provisional application No. 63/307,636, filed on Feb. 8, 2022.

(51) Int. Cl.
*H04L 9/40* (2022.01)
*H04L 69/08* (2022.01)

(52) U.S. Cl.
CPC ........ *H04L 63/166* (2013.01); *H04L 63/0236* (2013.01); *H04L 69/08* (2013.01)

(58) Field of Classification Search
CPC .... H04L 63/166; H04L 63/0236; H04L 69/08
USPC .......................................................... 726/1
See application file for complete search history.

(56) References Cited

U.S. PATENT DOCUMENTS 11,991,527 B2 * 5/2024 Jung .................... H04W 12/61
2020/0204443 A1 * 6/2020 Bar Oz ............... G06F 11/3051
2020/0274719 A1 * 8/2020 Pak ....................... G06F 9/4416
2022/0191700 A1 * 6/2022 Jung ................... H04W 12/041
2022/0345298 A1 * 10/2022 Cap ........................... H04L 9/14
2022/0376922 A1 * 11/2022 Kalach .................. H04L 9/0643
2023/0083034 A1 * 3/2023 Kondapavuluru .... H04L 63/061
713/151

* cited by examiner

*Primary Examiner* — Dereena T Cattungal

(57) ABSTRACT

A method of secure communication is provided. The method can include receiving a message from a first endpoint according to a first communication protocol, translating the message from the first communication protocol to a second communication protocol, and transmitting the message via a communication mode according to the second communication protocol. The method can further include translating the message from the second communication protocol to a third communication protocol and sending the message to a second endpoint according to the third communication protocol.

20 Claims, 17 Drawing Sheets

DUAL RELAY SYSTEM AND METHODS FOR SECURELY TRANSLATING AMONG COMMUNICATION PROTOCOLS

BACKGROUND OF THE INVENTION

The development of non-classical computers, such as quantum computers, may pose a threat to existing encryption algorithms. There is a need for improved security systems that may be more resilient to non-classical computers.

SUMMARY

In an aspect the present disclosure provides a method of secure communication. The method of secure communication may comprise translating between a first communication protocol and a second communication protocol. The first communication protocol can comprise at least one of: a Transport Layer Security (TLS) protocol; an Internet Message Access Protocol (IMAP); a Hypertext Transfer Protocol (HTTP) or Hypertext Transfer Protocol Secure (HTTPS); a Quantum Secure Layer (QSL) protocol; a Post-Quantum TLS (PQTLS) protocol; a hybrid protocol; or another secure protocol. The second communication protocol can differ from the first communication protocol. The translating can comply with standards of the first communication protocol and the second communication protocol.

In some embodiments, the second communication protocol can comprise a different at least one of: a TLS protocol; an IMAP; an HTTP or HTTPS; a QSL protocol; a PQTLS protocol; a hybrid protocol; or another secure protocol.

In some embodiments, the first communication protocol can comprise at least one of: a QSL protocol; a PQTLS protocol; TLS version 1.2; TLS version 1.3; a subsequent TLS version; IMAP4; IMAP2bis; IMAP2; or another IMAP version.

In some embodiments, the second communication protocol can comprise a different at least one of: TLS version 1.2; TLS version 1.3; a subsequent TLS version; IMAP4; IMAP2bis; IMAP2; or another IMAP version.

In some embodiments, the standards of the first communication protocol and the second communication protocol can comprise a unicity standard.

In some embodiments, the translating provides communication universality while complying with the unicity standard.

In some embodiments, the translating between the first communication protocol and the second communication protocol can comprise receiving a message encrypted according to a received protocol. The received protocol can comprise one of the first communication protocol or the second communication protocol. Translating between the first communication protocol and the second communication protocol can further comprise encrypting the message according to a sending protocol. The sending protocol can comprise one of the first communication protocol or the second communication protocol and can differ from the received protocol. Translating between the first communication protocol and the second communication protocol can further comprise sending the message encrypted according to the sending protocol.

In some embodiments, receiving the message encrypted according to the received protocol can further comprise decrypting the message according to the received protocol.

In some embodiments, the method can further comprise loading a shared library object associated with the first communication protocol or the second communication protocol. The method can further comprise initializing a function table for the first communication protocol or the second communication protocol.

In some embodiments, the method can further comprise at least one of: initializing an instance of the first communication protocol or the second communication protocol; configuring an instance of the first communication protocol or the second communication protocol; generating a session based on the first communication protocol or the second communication protocol; or finalizing an instance of the first communication protocol or the second communication protocol.

In some embodiments, the method can further comprise implementing at least one of: a proxy configured to negotiate a session; a translation shim configured to translate between the first communication protocol and the second communication protocol; a policy interface configured to manage policies, logs, rules, and/or errors; or a user interface.

In some embodiments, the method can further comprise generating at least one session based on the first communication protocol or the second communication protocol.

In some embodiments, the method can further comprise receiving an authentication certificate from a remote computer. The method can further comprise validating the authentication certificate.

In some embodiments, validating the authentication certificate can further comprise consulting a repository containing an end entity (EE) certificate for the remote computer and a certificate authority (CA) that has signed the EE certificate.

In some embodiments, the method can further comprise concurrently translating between a respective protocol of a first plurality of concurrent communication protocols and a respective protocol of a second plurality of concurrent communication protocols.

In some embodiments, the method can further comprise receiving a dynamic policy comprising configuration instructions. The translating between the first communication protocol and the second communication protocol can be based on the received configuration instructions.

In some embodiments, the configuration instructions comprise an identification of the first communication protocol or the second communication protocol. The translating between the first communication protocol and the second communication based on the received configuration instructions can be based at least on the identification of the first communication protocol or the second communication protocol.

In some embodiments, the configuration instructions comprise at least one rule, and the at least one rule comprises a conditional function and an action function.

In some embodiments, the method can further comprise identifying the first communication protocol or the second communication protocol. The translating between the first communication protocol and the second communication can be based on the identifying of the first communication protocol or the second communication protocol.

In some embodiments, the method can further comprise implementing a static policy by providing at least one parameter to at least one algorithm via a policy tree representing the static policy.

In some embodiments, the policy tree can comprise a node element containing a leaf element. The leaf element can comprise a key and a variable value corresponding to the key.

In some embodiments, the method can further comprise implementing a logging policy by controlling logging and/or data inspection.

In another aspect, the present disclosure provides a computing system configured to communicate securely. The computing system can comprise a memory and at least one processor coupled to the memory and configured to translate between a first communication protocol and a second communication protocol. The first communication protocol can comprise at least one of: a Transport Layer Security (TLS) protocol; an Internet Message Access Protocol (IMAP); a Hypertext Transfer Protocol (HTTP) or Hypertext Transfer Protocol Secure (HTTPS); a Quantum Secure Layer (QSL) protocol; a Post-Quantum TLS (PQTLS) protocol; a hybrid protocol; or another secure protocol. The second communication protocol can differ from the first communication protocol. To translate between the first communication protocol and the second communication protocol can comply with standards of the first communication protocol and the second communication protocol.

In another aspect, the present disclosure provides a non-transitory computer readable medium storing executable sequences of instructions to communicate securely, the executable sequences of instructions comprising instructions to translate between a first communication protocol and a second communication protocol. The first communication protocol can comprise at least one of: a Transport Layer Security (TLS) version 1.2 or greater protocol; an Internet Message Access Protocol (IMAP); a Hypertext Transfer Protocol (HTTP) or Hypertext Transfer Protocol Secure (HTTPS); a Quantum Secure Layer (QSL) protocol; a Post-Quantum TLS (PQTLS) protocol; a hybrid protocol; or another secure protocol. The second communication protocol can differ from the first communication protocol. To translate between the first communication protocol and the second communication protocol can comply with standards of the first communication protocol and the second communication protocol.

In another aspect, the present disclosure provides a method of secure communication. The method of secure communication may comprise receiving a message from a first endpoint according to a first communication protocol. The method may further comprise translating the message from the first communication protocol to a second communication protocol. The method may further comprise transmitting the message via a communication mode according to the second communication protocol. The method may further comprise translating the message from the second communication protocol to a third communication protocol. The method may further comprise sending the message to a second endpoint according to the third communication protocol.

In some embodiments, the second communication protocol can comprise a quantum-secure channel.

In some embodiments, the second communication protocol can comprise a Quantum Secure Layer (QSL) protocol or a Post-Quantum Transport Layer Security (PQTLS) protocol.

In some embodiments, the first communication protocol or the third communication protocol can comprise at least one of: a Quantum Secure Layer (QSL) protocol; a Post-Quantum Transport Layer Security (PQTLS) protocol; Transport Layer Security (TLS) version 1.2; TLS version 1.3; a subsequent TLS version; IMAP4; IMAP2bis; IMAP2; another IMAP version; Hypertext Transfer Protocol (HTTP); Hypertext Transfer Protocol Secure (HTTPS); another secure protocol; a hybrid protocol; or unsecured communication.

In some embodiments, the communication mode comprises at least one of: a network; wireless communication; radio frequency communication; a communication line; or free-space optical communication.

In some embodiments, the communication mode is unsecured.

In some embodiments, translating the message from the first communication protocol to the second communication protocol comprises: decrypting the message according to the first communication protocol; and encrypting the message according to the second communication protocol.

In some embodiments, translating the message from the second communication protocol to the third communication protocol can comprise decrypting the message according to the second communication protocol. Translating the message from the second communication protocol to the third communication protocol can further comprise encrypting the message according to the third communication protocol.

In some embodiments, translating the message from the first communication protocol to the second communication protocol can be performed by a first relay computing device. Translating the message from the second communication protocol to the third communication protocol can be performed by a second relay computing device.

In some embodiments, transmitting the message is performed from the first relay computing device to the second relay computing device.

In another aspect, the present disclosure provides a relay computing system configured to communicate securely. The relay computing system can comprise a memory and at least one processor coupled to the memory and configured to translate between a first communication protocol and a second communication protocol. The processor can be further configured to receive a message according to a first communication protocol. The processor can be further configured to translate the message from the first communication protocol to a second communication protocol. The processor can be further configured to transmit the message via a communication mode to a second relay computing system according to the second communication protocol. The second relay computing system can be configured to receive the message according to the second communication protocol. The second relay computing system can be further configured to translate the message from the second communication protocol to a third communication protocol. The second relay computing system can be further configured to send the message according to the third communication protocol.

In another aspect, the present disclosure provides a non-transitory computer readable medium storing executable sequences of instructions to communicate securely. The executable sequences of instructions can comprise instructions to receive a message according to a first communication protocol. The executable sequences of instructions can further comprise instructions to translate the message from the first communication protocol to a second communication protocol. The executable sequences of instructions can further comprise instructions to transmit the message to a relay computing system according to the second communication protocol. The relay computing system can be configured to receive the message according to the second communication protocol. The relay computing system can be further configured to translate the message from the second communication protocol to a third communication protocol. The relay computing system can be further configured to send the message according to the third communication protocol.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

TERMS

Figure 1A:
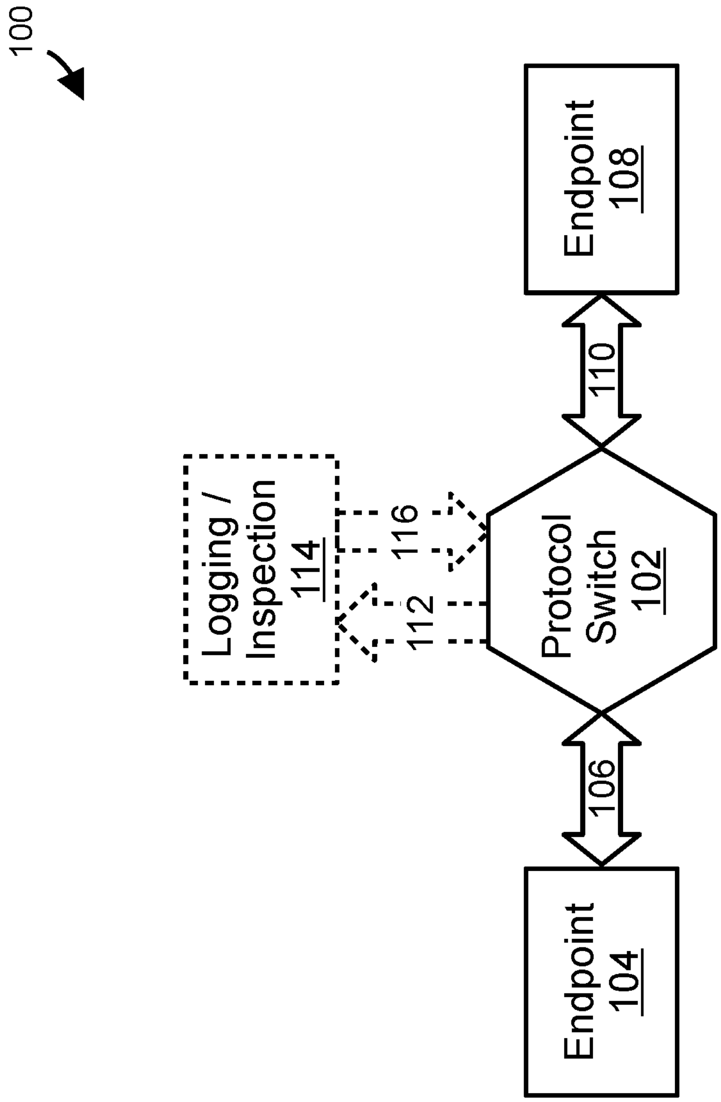
FIG. 1A is a block diagram illustrating a system for switching between communication protocols, according to an embodiment of the present disclosure.

Prior to discussing this disclosure, description of some terms may facilitate an understanding of the disclosed subject matter.

The Transport Layer Security (TLS) protocol is a standard cryptographic protocol securing communications over a network such as the Internet.

Internet Message Access Protocol (IMAP) is a standard protocol for electronic mail (email) communications over a network such as the Internet.

Hypertext Transfer Protocol (HTTP) is a standard communication protocol for communications such as HTML or World Wide Web browsing, over a network such as the Internet. Hypertext Transfer Protocol Secure (HTTPS) is a standard communication protocol securing HTTP for secure communications such as HTML or World Wide Web browsing, over a network such as the Internet.

The Post-Quantum TLS (PQTLS) is a modified TLS protocol that provides additional security against non-classical computing attacks, such as quantum computing attacks.

The Quantum Secure Layer (QSL) protocol is a cryptographic protocol that provides full security against non-classical computing attacks, such as quantum computing attacks.

An endpoint or communication endpoint may refer to a point where communication initiates or ends, such as a client or server.

An end entity (EE) certificate is an x509v3 public key certificate issued to an endpoint such as a client device.

A management port may refer to a dedicated port used for managing and/or configuring networking devices via a specialized management network. In some cases, a management port may be an Ethernet port and may be used exclusively for remote access.

A certificate authority (CA) is a server that issues and signs trusted certificates used to generate secure connections over a network such as the Internet.

A public key infrastructure (PKI) is a set of digital objects for managing public-key encryption and validating client certificates.

Quantum PKI (QPKI) is a quantum-secure version of a PKI that can manage post-quantum-level, as well as classical, verification, validation, and revocation of client certificates.

Server Name Identification (SNI) is an extension of TLS enabling a client to indicate a host to which it will connect in the handshake or negotiation.

A unicity standard may be a standard of a given communication protocol that specifies that direct connections are only supported with the same communication protocol. In some cases, the unicity standard may specify that direct connections are only supported with the same version of the same communication protocol.

Universality may refer to communications that can take place between endpoints using any communication protocols, including different protocols.

DETAILED DESCRIPTION

The invention will now be described more fully hereinafter with reference to the accompanying drawings, in which illustrative embodiments of the invention are shown. While various embodiments of the invention are shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms “a,” “an,” and “the” include plural references unless the context clearly dictates otherwise. Any reference to “or” herein is intended to encompass “and/or” unless otherwise stated.

Whenever the term “at least,” “greater than,” or “greater than or equal to” precedes the first numerical value in a series of two or more numerical values, the term “at least,” “greater than” or “greater than or equal to” applies to each of the numerical values in that series of numerical values. For example, greater than or equal to 1, 2, or 3 is equivalent to greater than or equal to 1, greater than or equal to 2, or greater than or equal to 3.

Whenever the term “no more than,” “less than,” “less than or equal to,” or “at most” precedes the first numerical value in a series of two or more numerical values, the term “no more than,” “less than,” “less than or equal to,” or “at most” applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein, like characters refer to like elements.

Quantum computers may pose a threat to existing encryption algorithms, for example by being able to break classical cryptographic algorithms. Accordingly, improved security systems have been developed, and continue to be developed, that are more resilient to non-classical computers such as quantum computers. It is desirable to be able to protect communication technologies, including existing technologies such as the Internet, email and other messaging clients, and web browsers that may use legacy encryption protocols, using newer security systems that are quantum secure. The disclosed system and methods can address these needs.

FIG. 1A is a block diagram illustrating a system 100 for switching between communication protocols, according to an embodiment of the present disclosure. In this example, protocol switch 102 can intermediate between endpoints 104 and 108 (e.g., computers), which are configured to communicate using different protocols. An endpoint or communication endpoint may refer to a point where communication initiates or ends, such as a client, a server, and/or another device, service, or application. In particular, protocol switch 102 can communicate with endpoint 104 using a first protocol 106, and can communicate with endpoint 108 using a second protocol 110. Note that, in some embodiments, the communication may proceed in either direction, and/or both directions, between endpoints 104 and 108. For example, the communication may proceed from endpoint 104, through protocol switch 102, to endpoint 108. Likewise, the communication may proceed from endpoint 108, through protocol switch 102, to endpoint 104. In some examples, the communication may proceed in both directions. Note that this reversibility may correspond to the reversibility of communication described in the examples of FIGS. 5A and 5B below.

In various embodiments, endpoints 104 and 108 may be any computing devices and/or mobile devices, including client devices and/or servers, and are not limited by the present disclosure. For example, endpoints 104 and 108 can include computer systems such as computer system 1300 of the example of FIG. 13 below. Protocol switch 102 may also be a computer system, a server, a client device, and/or another computing device. In some embodiments, the protocol switch may be part of the first endpoint 104 and/or part of the second endpoint 108. For example, the protocol switch may include software or a module executed by endpoints 104 and/or 108, or may include a specialized hardware component included in endpoints 104 and/or 108.

For example, the first communication protocol 106 can include a Transport Layer Security (TLS) protocol; an Internet Message Access Protocol (IMAP); a Hypertext Transfer Protocol (HTTP) or Hypertext Transfer Protocol Secure (HTTPS); a Quantum Secure Layer (QSL) protocol; a Post-Quantum TLS (PQTLS) protocol; a hybrid protocol; or another secure protocol.

The second communication protocol 110 may differ from the first communication protocol 106. For example, the second communication protocol 110 can comprise a different at least one of: a TLS protocol; an IMAP; an HTTP or HTTPS; a QSL protocol; a PQTLS protocol; a hybrid protocol; or another secure protocol. Universality may refer to communications that can take place between endpoints using any communication protocols, including different protocols. Because the disclosed protocol switch system 102 and methods can translate between different communication protocols, the disclosed system and methods enable universal communication among endpoints using different protocols.

For example, the first communication protocol 106 can comprise at least one of: a QSL protocol; a PQTLS protocol; TLS version 1.2; TLS version 1.3; a subsequent TLS version; IMAP4; IMAP2bis; IMAP2; or another IMAP version. Likewise, the second communication protocol 110 may comprise a different at least one of: TLS version 1.2; TLS version 1.3; a subsequent TLS version; IMAP4; IMAP2bis; IMAP2; or another IMAP version.

The translating can comply with standards of the first communication protocol and the second communication protocol. In particular, the standards of the first communication protocol 106 and the second communication protocol 110 may comprise a unicity standard. For example, the unicity standard of a given communication protocol may specify that direct connections are only supported with the same communication protocol, and/or with the same version of the same communication protocol. For example, TLS versions 1.2, 1.2h, and 1.3 have such unicity standards. In particular, the TLS unicity standards specify that connections are only supported between TLS version 1.2 and TLS version 1.2, between TLS version 1.2h and TLS version 1.2h, and between TLS version 1.3 and TLS version 1.3.

The translating can comply with such unicity standards. Accordingly, the disclosed system and methods enable universality, even while complying with unicity at the same time and using the same system. This is possible because the protocol switch can decrypt communications from the first endpoint 104 using the first protocol 106, and can re-encrypt communications to the second endpoint 108 using the second protocol 110, as described in the example of FIG. 7 below. Likewise, the protocol switch can decrypt communications from the second endpoint 108 using the second protocol 110, and can re-encrypt communications to the first endpoint 104 using the first protocol 106. Thus, the protocol switch 102 can translate communications in either direction, for example by decrypting messages received from either endpoint 104 or endpoint 108, re-encrypting the messages, and sending them to either endpoint 108 or endpoint 104, respectively. Accordingly, the protocol switch can communicate with the first endpoint 104 using only the first protocol 106, in compliance with any applicable unicity standard. Likewise, the protocol switch can communicate with the second endpoint 108 using only the second protocol 110, in compliance with any applicable unicity standard.

Protocol switch 102 can optionally also send 112 the message to a security appliance 114, e.g., for logging and/or inspection. For example, security appliance 114 can include a firewall, an anti-virus system, a content filtering device, an intrusion detection appliance, a preventative device, a Unified Threat Management appliance, or the like. In some examples, protocol switch 102 can send 112 the message to the security appliance 114 using an application programming interface (API). The security appliance 114 can optionally return 116 a response to the protocol switch 102, such as a clearance to proceed with sending to the second endpoint 108.

In some embodiments, protocol switch 102 may optionally send 112 the message to security appliance 114 after decrypting the message using the first protocol 106 but before encrypting the message using the second protocol 110. Thus, the protocol switch 102 may send 112 the message in plaintext. The security appliance 114 could be located within the same local-area network (LAN) as the protocol switch 112, and/or could have a trust relationship with the protocol switch 112, etc. As a result, the message may remain secure when sent to security appliance 114.

In a typical configuration, the protocol switch 102 may handle up to some number of connections from a single host. For example, protocol switch 102 may handle up to 64 connections per host, or a total of 1024 connections overall. In some embodiments, these limits may be configurable. In some embodiments, the NIC bandwidth may be 25 Mbps or more. The protocol switch 102 may preferably utilize many cores efficiently.

Figure 1B:
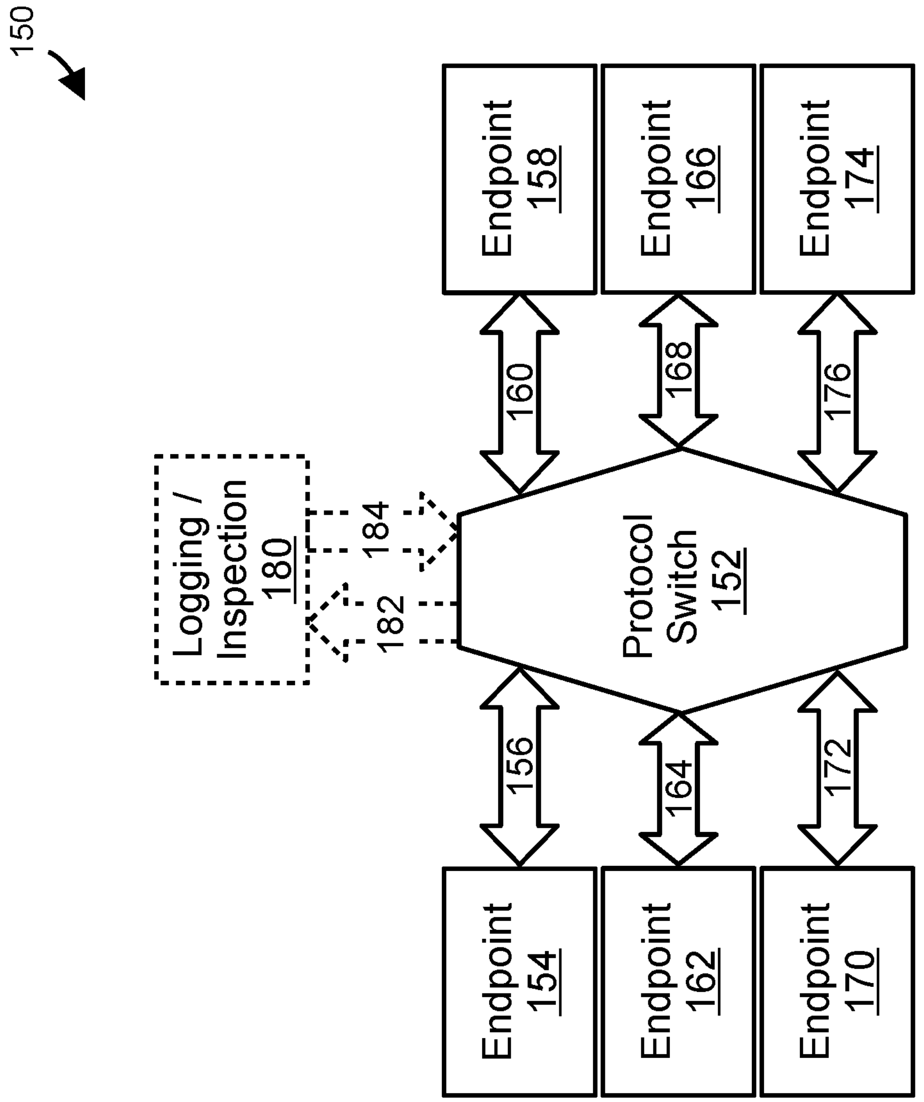
FIG. 1B is a block diagram illustrating a system for concurrently switching between multiple communication protocols, according to an embodiment of the present disclosure.

FIG. 1B is a block diagram illustrating a system 150 for concurrently switching between multiple communication protocols, according to an embodiment of the present disclosure. In this example, protocol switch 152 can concurrently intermediate between multiple initiator endpoints 154, 162, and 170, such as client computers or devices, and multiple recipient endpoints 158, 166, and 174, such as servers, which are configured to communicate using different protocols. In particular, initiator endpoints 154, 162, and 170 may use protocols 156, 164, and 172, respectively, which can differ from each other. Likewise, recipient endpoints 158, 166, and 174 may use protocols 160, 168, and 176, respectively, which can also differ from each other. Protocol switch 152 can concurrently translate among these protocols between the initiator and recipient devices, for example in separate sessions.

As in the example of FIG. 1A above, the protocol switch 152 may decrypt received messages in a received protocol, and then re-encrypt the messages in a sending protocol. Accordingly, the protocol switch may access the messages in plaintext. Protocol switch 152 can optionally also send 182 the message to a security appliance 180, e.g., for logging and/or inspection. The security appliance 180 can optionally return 184 a response to the protocol switch 152, such as a clearance to proceed. In some embodiments, protocol switch 152 may optionally send 182 the message to security appliance 180 after decrypting the message but before re-encrypting the message. The security appliance 180 could be located within the same local-area network (LAN) as the protocol switch 152, and/or could have a trust relationship with the protocol switch 152, so the message may remain secure when sent to security appliance 180.

Figure 2A:
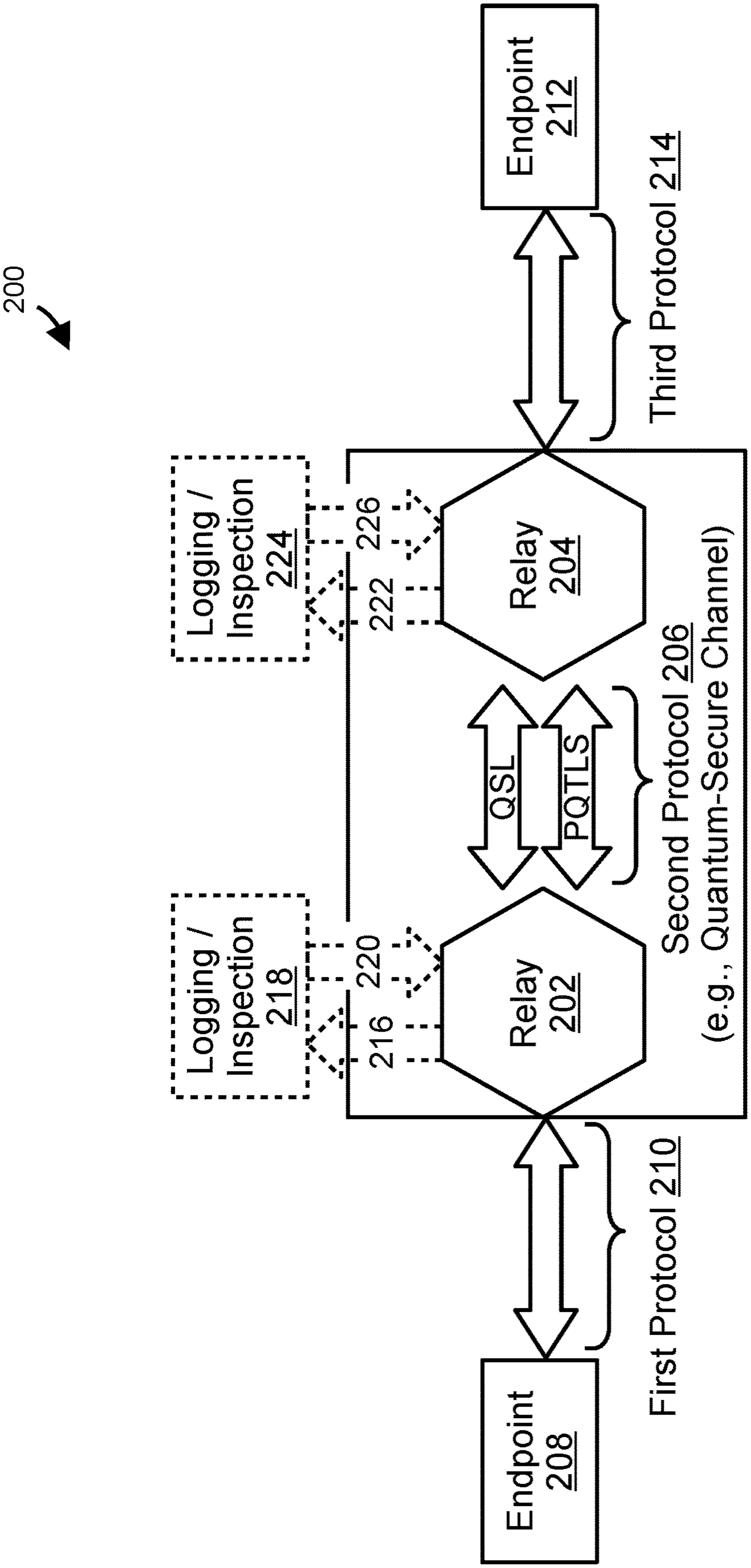
FIG. 2A is a block diagram illustrating a system for secure universal communication between two endpoints that use different communication protocols, such as legacy protocols, according to an embodiment of the present disclosure.

FIG. 2A is a block diagram illustrating a system 200 for secure universal communication between two endpoints that use different communication protocols, such as legacy protocols, according to an embodiment of the present disclosure. The protocol switch 102 of the example of FIG. 1A above can enable endpoints (e.g., computers) to communicate with each other using diverse communication protocols, even while complying with any applicable unicity standards. In this example, two protocol switches are used, which may be referred to as relays.

As shown, at least one endpoint 208, such as a client computer or computing device, can communicate with the first relay 202 via a first communication protocol 210, which may be a legacy communication protocol. The first relay 202 can then communicate securely with the second relay 204 via a second communication protocol 206. In some examples, the second communication protocol may be a quantum-secure channel 206, such as QSL and/or PQTLS. In other examples, the second protocol may be a standard or legacy communication protocol, and is not limited by the present disclosure. Because the disclosed dual-relay system 200 and methods can translate between endpoints 208 and 212, which can use different communication protocols 210 and 214, the disclosed system and methods enable universal communication among endpoints using diverse protocols. Moreover, the disclosed system and methods can comply with any applicable unicity standards, even while simultaneously enabling universality within the same system.

In one example, the endpoint 208 shown to the left may be a client computing device, while the endpoint 212 shown to the right may be a server. Alternatively, the two-relay configuration 200 can be used to enable any two endpoints to communicate with each other, for example, two clients, two servers, and/or any other types of devices, and is not limited by the present disclosure.

In particular, the two-relay configuration 200 can be used to enable two devices configured to communicate via legacy protocols to nevertheless make use of a quantum-secure channel 206. In some embodiments, the communication between the clients and the first relay 202 may be secure even if a legacy protocol is used, for example because the clients and the first relay 202 can be located within the same LAN. When messages from the clients reach the first relay 202, they can then be switched from a legacy protocol to a quantum-secure protocol, such as QSL or PQTLS, following the procedures disclosed herein (for example, see FIG. 1A above and FIGS. 6-7 below). The messages can then be transmitted from the first relay 202 to the second relay 204 via the quantum-secure protocol 206. Accordingly, while messages are in transit using the disclosed system and methods between first relay 202 and second relay 204, in either direction, they can be secure against non-classical attacks, for example attacks using quantum computers. This can be true even when the two relays communicate with each other over public channels, such as the Internet or another public network. Accordingly, the two-relay configuration 200 can provide quantum-secure universal communication even between two endpoints that use legacy protocols.

When messages from first relay 202 reach second relay 204, they can be switched from the second protocol 206 (e.g., a quantum-secure protocol) to the third protocol 214. The messages can then be sent to the endpoint 212 using the third protocol 214. In an example, this last stage of communication might also be secure, because the second relay 204 and the endpoint 212 may be located within the same LAN. In this example, both endpoints can communicate using legacy protocols, while strictly complying with unicity standards of the legacy protocols, and yet their communication can be secured by a quantum-secure protocol 206 between the two relays. In various examples, the first communication protocol 210 and the third protocol 214 may be different from each other, or they may be the same but differ from the second protocol 206. For example, first protocol 210 and third protocol 214 may be the same quantum-unsecure protocol, or be two different quantum-unsecure protocols, while second protocol 206 can be quantum-secure. In such an example, the two-relay configuration 200 provides quantum-secure communication even between endpoints configured to use legacy protocols.

Alternatively, in some embodiments, the second protocol 206 is not necessarily a quantum-secure protocol. For example, the disclosed two-relay configuration 200 may be used to enable endpoint 208 (e.g., a client) to communicate with endpoint 212 (e.g., a server) despite using deprecated communication protocols. For example, the first protocol 210 could be TLS version 1.2 and the third protocol 214 could be TLS version 1.2h. In such an example, the second protocol 206 could be TLS version 1.3, which is not quantum-secure, but is still more up to date than the first protocol 210 and third protocol 214.

As in the example of FIG. 1A, relay 202 can optionally send 216 the message to a security appliance 218, such as a firewall, an anti-virus system, a content filtering device, an intrusion detection appliance, or the like. For example, security appliance 218 may perform logging and/or inspection of the message, and may optionally return 220 a response to the relay 202. In some embodiments, relay 202 sends 218 the message to security appliance 218 after decrypting the message using the first protocol 210 but before encrypting the message using the second protocol 206. Accordingly, relay 202 may send 218 the message to security appliance 218 in plaintext. The security appliance 218 may be located within the same LAN as the relay 202, and/or have a trust relationship with the relay 202, so the message may remain secure.

Likewise, relay 204 can optionally send 222 the message to a security appliance 224, e.g. to perform logging and/or inspection of the message. The security appliance 224 may optionally return 226 a response to the relay 204. In some embodiments, relay 204 sends 222 the message to security appliance 224 after decrypting the message using the second protocol 206 but before encrypting the message using the third protocol 214. Accordingly, relay 204 may send 222 the message to security appliance 224 in plaintext. The security appliance 224 may be located within the same LAN as the relay 204, and/or have a trust relationship with the relay 204, so the message may remain secure.

Figure 2B:
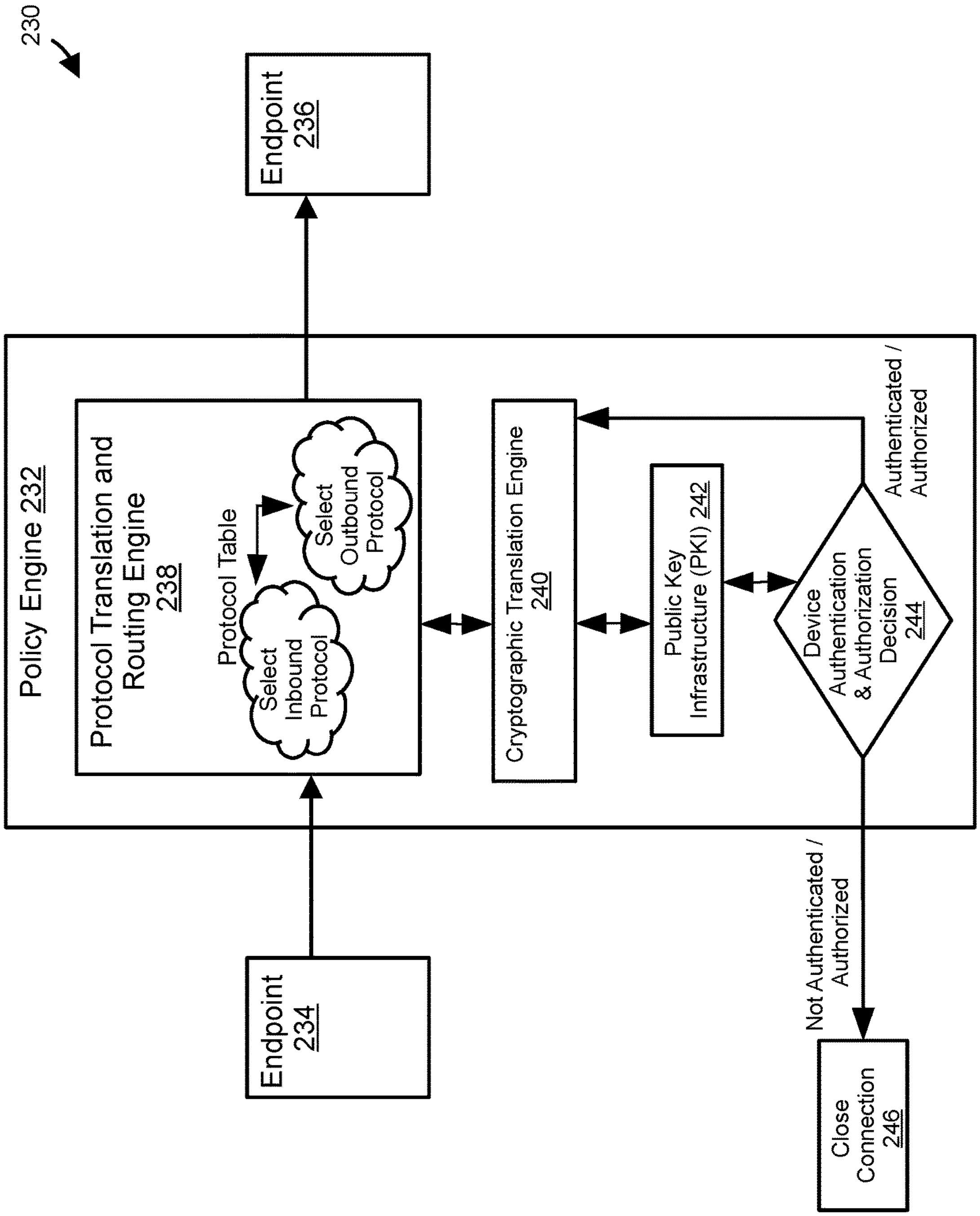
FIG. 2B is a block diagram illustrating a policy engine system including a protocol translation and routing engine for secure universal communication between endpoints that use different communication protocols, according to an embodiment of the present disclosure.

FIG. 2B is a block diagram illustrating a protocol switching system 230 including a policy engine 232 and a protocol translation and routing engine 238 for secure universal communication between endpoints that use different communication protocols, according to an embodiment of the present disclosure. In this example, a first endpoint 234 (e.g., a computing device) can send a message using a first protocol to a policy engine 232 associated with a protocol switch 230. The policy engine 232 can translate the message to a second protocol and send the translated message to a second endpoint 236 (e.g., a second computing device) using the second protocol.

In some embodiments, the policy engine 232 can be a control plane, such as software or computer instructions, for controlling a protocol switch 230. In this example, the policy engine 232 can include a protocol translation and routing engine 238 as well as a cryptographic translation engine 240, a public key infrastructure (PKI) 242, and a device authentication and authorization decision 244. In particular, the policy engine 232 may direct the protocol translation and routing engine 238, which may perform the tasks involved in translating the protocols.

For example, the policy engine 232 can function as a control interface by which a user can set and control the behavior of the protocol switch 230. A user or administrator may interface with the policy engine 232 to set policies or rules for protocol input and output and protocol translation. In some examples, the user or administrator may set business-specific rules for an organization or local network. For example, the user or administrator may use the policy engine 232 to set blacklists and/or whitelists, such as lists of hosts with which to disallow or allow connections, respectively. The policy engine 232 can then implement the policies and rules set by the user or administrator, for example executing software or computer instructions to control the protocol translation and routing engine 238 and/or any other components of protocol switch 230 in compliance with these policies and rules.

In some embodiments, the policy engine 232 can autodetect the specific protocols used by the first endpoint 234. In some embodiments, the policy engine 232 can be configured to control the translation between these specific protocols, for example by a user or administrator. In some examples, the policy engine 232 can only auto-detect legacy protocols, such as versions of TLS, and can be configured to use protocols that it cannot detect, such as quantum-secure protocols, QSL, PQTLS, and the like.

In some embodiments, the policy engine 232 can implement a policy manager. The policy manager may have three responsibilities: providing parameters to algorithms that make use of them, which will be referred to as "static" policy; evaluating rules that may result in actions, which will be referred to as "dynamic" policy; and controlling logging and data inspection. Controlling logging and data inspection can have both static and dynamic aspects, and thus may be simply referred to as "logging policy" or "logging."

Static policy can manage a policy tree, which can be a set of <key, value> pairs organized in a singly-rooted tree that can have aspects of a filesystem. Each element in the tree can either be a leaf or a node. A leaf is a variable that may have a value, has scoped access, and may also have help text and metadata. A node is a container for other nodes and/or leaves. A node should not have a value, access modifiers, metadata or help text. In an embodiment, the property that nodes have ubiquitous access may solve a common filesystem problem wherein a file permits some type of access, but the access modifiers on some ancestor directory prohibit access to the file in question.

Access can be specified via role-based access control (RBAC). Every leaf should have an owner U, and U should be the only member of the RBAC group gU. Accordingly, each leaf can be accessed by at least one group. Thus, in contrast with some filesystems, every leaf of the policy tree may be accessible (i.e., there may be no completely inaccessible, "mode 000" leaves).

In some embodiments, there are other important differences between the policy tree and a filesystem hierarchy. In an example, the policy tree may not contain hard links or symbolic links, such that the policy tree may always be loop-free. In another example, it may be impossible to delete a leaf or node in a running instance of the policy tree. In yet another example, the policy tree may not have an equivalent of any type of "special" file, for example it may not have sockets, pipes, device files, etc. With the exception of logging policy, there may be no way to create a new leaf or node in a running instance of the policy manager.

Node names, leaf names and leaf values may be 7-bit ASCII, Unicode, or binary. Unicode text that is not in the ASCII subset should be represented using the "C" coding convention \unnnn. In an embodiment, Unicode characters that are encoded as more than 4 bytes are not supported. Binary values can be ASCII encoded in the form T,L, V, where Tis a tag of exactly 16 characters, L is the length in bytes of V, and V itself is the base64 encoding of the binary value. It may cause an error if L is 0. For example, the following is a valid binary value "T=abababababababab22, L=4,V=0F34A809". In an embodiment, the equal sign = is forbidden to appear anywhere except in a binary encoding. In a quoted string value it must appear as \=. The equal sign may not be part of any name.

There may be four types of values: hidden, masked, ro and rw. A hidden value can have an encrypted name and an encrypted value. A masked value can have a plaintext name and an encrypted value. The terms ro and rw refer to read-only and read/write values in plaintext.

All values are strongly typed, and may have additional restrictions, resulting in a dependent type. For example, "uint16_t" is an ordinary type, while "int16_t in the range [−1024,1023]" is a dependent type. In an example, the only form of implicit type coercion permitted may be the widening of numeric types. Thus, a uint8_t with the value 5 may be coerced to uint16_t. Narrowing may not be permitted, so that a uint16_t with value 33 may not be assigned to a uint8_t, even though the value 33 does fall within the range of an unsigned byte.

String values should be considered as constant values. In an embodiment, the only operation permitted on a string value is to overwrite it completely with another string value. In an embodiment, "C" standard string concatenation ("over the" "bridge"="over the bridge") is not supported. Plaintext string values should not be empty (" "), and should not contain embedded nulls (\0). The null pointer NULL may not be supported. Furthermore, in some embodiments, the policy manager may not support any type of pointer.

The path separator for names can be a dot ("•"). Since node elements of the policy tree may not have values, the final component in the path may always be the variable name. For example, a.b.c may specify the variable c in the namespace b in the namespace a. In an embodiment, a value binding may be specified using whitespace, so that a.b.c 22 means the previously named variable c has the value 22. The typename may be prepended to the value, as in a.b.c (uint16_t)22. However, note that prepending the typename may prevent any implicit widening, so that if c has any type other than uint16_t, this statement may cause an error.

Each node may be associated with its own namespace. For example, there may be no relationship between a.b.c and x.y.z.c. If the policy tree is considered to be an ontology, then every name can have a numeric equivalent, which can be referred to as the name's object identifier (OID). The root of the policy tree may not have a name, but may have an OID of 1. For example, if a=12 in the root context, and b=108 in the "a" context, and c=33 in the "a.b" context then the value binding a.b.c 22 may be exactly equivalent to 1.12.108.33 22. Finally, the policy tree may support only absolute paths in the ontology, for example there may be no equivalent for a relative filesystem entry such as " . . . ".

The policy tree nomenclature can support two directives: include and enum, with the same syntax as in C. Also, C-style comments // and /* . . . */ may be supported. In an enum, a member that is used as a value should be described as enumname.membername.

In some embodiments, values may be specified values, default values, or can be unbound. In some cases, some variables may not have default values, so care must be taken when accessing a variable. If a variable is unbound then it has no value, and accordingly, attempting to read such an unbound variable may cause an error. Convenience functions, such as defaultp(name) and boundp(name), may be provided in order to determine if the corresponding properties hold. These may be Boolean functions.

If N is a name, the value of N.meta can be the name of a file containing metadata for N. Metadata may not be normative and not be serialized. For example, the metadata may only be accessed on request. In an example, the maximum length of a metadata file may be 4096 bytes. In an example, if the actual file size is larger than this, then only the first 4096 bytes may be read. N may also have associated help text in N.help. The maximum length of the help text may be 256 bytes. Help text may be strongly recommended, but not mandatory.

A file named qpm.conf can be a representation of the static policy, and may include a record of the static policy. This file can preferably be put in the directory/etc, and subsidiary files can be put in the directory/etc/qpm.d. While qpm.conf can be a text file, it may not be directly editable.

Instead, tools named get-policy and set policy may be used to read or write the static policy. However, the contents of any metadata may be edited at any time. In particular, changing metadata may not be considered a policy change.

The static policy file and all the files included by it should be signed. For example, a "signature" may be an actual signature or a hash-based message authentication code (HMAC). The policy file may be serialized. The serialized policy file can capture the entire policy state, except that the metadata should not be serialized. The policy data stream may be verified at any time, even if the policy manager is running a different version. However, in some embodiments, a policy data stream may be deserialized if any only if the current version of the policy manager is identical to the version in the data stream.

Dynamic policy can be a set of rules, called frames, which may cause actions under certain conditions. A frame may be written as F slot1 . . . slotn A. Here, F can be the name of a function with the signature <b,blob>F ([list slots]). This function can be called when all slots have a value. There should be at least one slot, and also at least one unbound slot. The data types of each slot can be independent of one another.

In particular, the function F can return a Boolean value b and a binary blob in TLV notation. In an example, the TLV notation used in dynamic policy can be similar to the T,L, V notation used in static policy described above. In an example, unlike in static policy, L=0 may be permitted for dynamic policy, in which case V=00. Note also that the blob can be allocated memory. If b is false, then frame-reset may be called, whereas if b is true, the function A can be called.

The function A may have the signature void A([list slots],blob). In some examples, it is possible for A to shutdown the policy manager, in which case the function call to A may never return. If A does return, then frame-reset can be executed. Frame-reset can free the blob memory, set all previously unbound slots to an unbound state, and set all previously defaulted slots back to their default values. All the functions F and A may be found in a dynamic shared library named qpolicy.so. This shared library should be signed. Frames should not be serialized, but it is possible for them to be logged.

Logging policy can have both static and dynamic components. The head node for the logging ontology can be "logging," which can have two subnodes named "srcs" and "dests". The static logging policy tree can have the property that new nodes and/or leaves may be added to the tree using the utility program logging-policy. It may not be possible to delete these dynamic names, but they can be disabled, for example by setting the value N.enabled to false. The static logging policy may be part of the serialized form of the policy file. The frame and action functions may be read from a signed dynamic library called qloggingpolicy.so. Note that functions in qpolicy.so and qloggingpolicy.so can be loaded into the same namespace, so function names should not overlap between the two libraries.

The cryptographic translation engine 240 can translate between communication protocols, as described in the examples of FIGS. 1A-1B above and FIGS. 6-7 below. Accordingly, in some examples, the cryptographic translation engine 240 provides communication universality between any communication protocols, or between any protocols that are supported. For example, the cryptographic translation engine 240 may translate between a legacy or classical protocol, such as the communication standard FIPS 140-2, and a quantum-secure protocol, such as the communication standard FIPS 140-3. For example, FIPS 140-2 may include all TLS versions. In another example, the cryptographic translation engine 240 may support some FIPS 140-2 protocols, such as TLS version 1.2 and subsequent versions. FIPS 140-3 may include quantum-aware protocols, such as QSL, PQTLS, and the like.

The PKI 242 may perform tasks related to validating a client certificate. For example, in the case of a quantum-unaware client system, PKI 242 may use PKI digital objects that can support standard and/or legacy PKI methods. These digital objects and PKI-compatible methods will be described further in the examples of FIGS. 4 and 10 below. In the case of a quantum-aware or quantum-secure client system, the digital objects of PKI 242 can handle post-quantum-level verification. In particular, PKI 242 may use methods referred to as quantum PKI (QPKI). In some embodiments, the PKI 242 makes use of the same digital objects for both the PKI certification described herein and the QPKI certification. Accordingly, using PKI 242, the disclosed system and methods can handle validating client certificates using standard and/or legacy PKI methods as well as post-quantum-level verification and/or QPKI methods.

The PKI 242 will be described further in the example of FIG. 4 below. In some examples, PKI 242 can be, or can include, a server executed by the protocol switch 230, and/or by a computing device (such as device 1300 of the example of FIG. 13) that can also implement the protocol switch 230.

In some embodiments, PKI 242, or a module or component thereof, may perform the device authentication and authorization decision 244. The device authentication and authorization decision 244 may permit or reject authentication and/or authorization of a request, according to whether the request is permitted. For example, decision 244 may be based on the policies set via policy engine 232, as described above. If the authentication and authorization decision 244 is to permit the request, the system (e.g., PKI 242) may send the request to cryptographic translation engine 240 for translation. Alternatively, if the authentication and authorization decision 244 is to reject the request, the system may close 246 the connection.

Figure 2C:
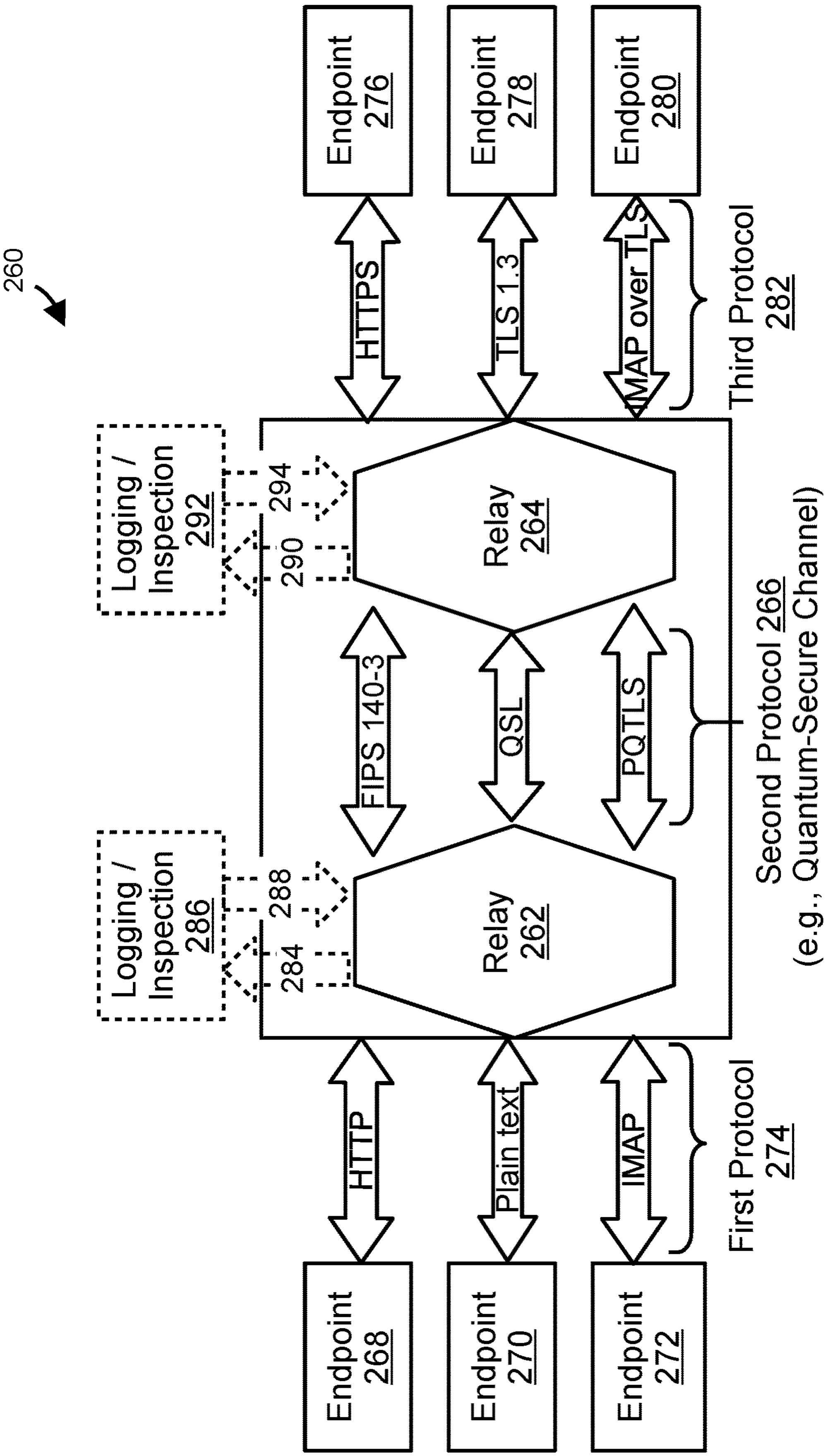
FIG. 2C is a block diagram illustrating a system for secure universal concurrent communication between multiple endpoints that use different communication protocols, such as legacy protocols, according to an embodiment of the present disclosure.

FIG. 2C is a block diagram illustrating a system 260 for secure universal concurrent communication between multiple endpoints that use different communication protocols, such as legacy protocols, according to an embodiment of the present disclosure. As shown, multiple endpoints 268, 270, and 272 (for example, client computers or computing devices) can communicate with the first relay 262 via a first communication protocol 274, which may be a legacy communication protocol. The first relay 262 can then communicate securely with the second relay 264 via a second communication protocol 266. In some examples, the second communication protocol may be a quantum-secure channel 266, such as QSL, PQTLS, FIPS 140-3, and the like. In other examples, the second protocol may be a standard or legacy communication protocol, and is not limited by the present disclosure.

When messages from first relay 262 reach second relay 264, they can be switched from the second protocol 266 (e.g., a quantum-secure protocol) to the third protocol 282. The messages can then be sent to the endpoints 276, 278, and 280 (for example, servers or computing devices) using the third protocol 282. In an embodiment, multiple concurrent sessions can take place, so that each initiating endpoint exchanges messages only with its respective designated receiving endpoint. For example, initiating endpoint 268 may communicate with receiving endpoint 276, while initiating endpoint 270 communicates with receiving endpoint 278 and initiating endpoint 272 communicates with receiving endpoint 280.

In an example, relay 262 can simultaneously translate among various first protocols 274, which may differ from each other, and second protocols 266, from respective endpoints 268-272, for example in separate sessions. Likewise, relay 264 can simultaneously translate among various second protocols 266 and third protocols 282, which may also differ from each other, for communication among respective recipient endpoints 276-280, for example in separate sessions.

In one example, the endpoints 268-272 shown to the left may be client computing devices, while the endpoints 276-280 shown to the right may be servers. Alternatively, the two-relay configuration 260 can be used to enable any number and type of endpoints to communicate concurrently with each other, for example, any number of clients, servers, and/or any other types of devices, and is not limited by the present disclosure.

As in the example of FIG. 2A above, the first relay 262 and second relay 264 may decrypt received messages in a received protocol, and then re-encrypt the messages in a sending protocol. Accordingly, the respective relays may access the messages in plaintext. First relay 262 can optionally also send 284 the message to a security appliance 286, e.g., for logging and/or inspection. The security appliance 286 can optionally return 288 a response to the first relay 262, such as a clearance to proceed. In some embodiments, relay 262 may optionally send 284 the message to security appliance 286 after decrypting the message but before re-encrypting the message. The security appliance 286 could be located within the same LAN as the relay 262, and/or could have a trust relationship with the relay 262, so the message may remain secure when sent to security appliance 286.

Likewise, second relay 264 can optionally send 290 the message to a security appliance 292, e.g., for logging and/or inspection. Security appliance 292 can optionally return 294 a response to the relay 264, e.g. a clearance to proceed. In some embodiments, relay 264 may send 290 the message to security appliance 292 after decrypting the message but before re-encrypting the message. The security appliance 292 could be located within the same LAN as relay 264, and/or could have a trust relationship with the relay 264, so the message may remain secure.

Figure 3:
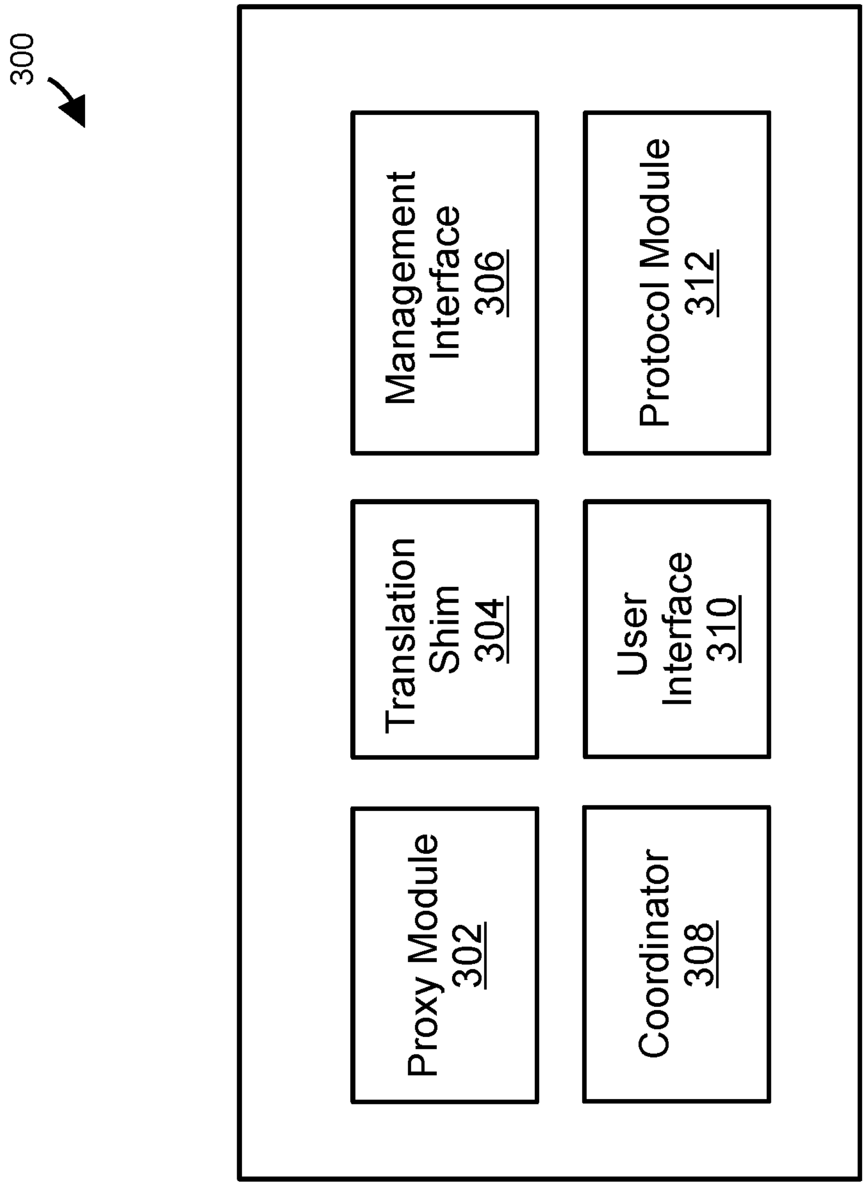
FIG. 3 is a block diagram illustrating components of a system for switching between communication protocols, according to an embodiment of the present disclosure.

FIG. 3A is a block diagram illustrating components of a system 300 for switching between communication protocols, according to an embodiment of the present disclosure. System 300 may include a proxy module 302, a translation shim 304 (which may also be referred to herein as a protocol shim), a policy interface 306, a coordinator 308, a user interface (UI) 310, and a protocol module 312.

Proxy module 302 may implement a control plane for negotiation. Proxy module 302 may run in userspace and may listen on ports (for example 443, 8443, 993 and 8993). It may also listen on a management port for encrypted policy transactions and logging (for example, port 1880). In one embodiment, only TLS over TCP is provided. Alternatively, DTLS (TLS over UDP) may also be provided.

The proxy module 302 may present all ciphersuites known to it on any servers. Note that there may be no overlap between TLS v. 1.2 cipher names and v. 1.3 cipher names. Once negotiation with the client is complete, the proxy module 302 can use Server Name Identification (SNI) to indicate the DNS hostname of a server supported by the target endpoint with which the client seeks to communicate. No client changes are required.

The policy manager may be configured to reject renegotiation by closing the connection. The client can then be free to perform renegotiation with the proxy module 302.

In an embodiment, the proxy 302 includes the translation shim or protocol shim 304, the coordinator 308, and the protocol module 312. In this embodiment, this design of proxy 302 can be flexible and can be adjusted as needed.

The translation shim or protocol shim 304 may implement a data plane for protocol translation. Protocol shim 304 may handle continuous, full-duplex, bi-directional data stream. In a typical case, the protocol shim 304 may take over a pair of TLS connections negotiated by the negotiation proxy 302 and manage all communication between the two endpoints until both connections are shut down.

However, in some embodiments, more complex interaction between the proxy 302 and the shim 304 may be possible. For example, if the initiator uses a plaintext protocol that supports opportunistic TLS (HTTP, SMTP, IMAP, etc.), the protocol shim 304 may yield to the negotiation proxy 302 when/if it receives a "STARTTLS" command from the recipient.

In the case of HTTP, the SNI value for the ClientHello to be sent to the recipient becomes known only after having received a Host header field from the initiator. Negotiation with the recipient cannot begin until that point. Assuming that the protocol shim 304 will be responsible for parsing HTTP requests, this is another scenario when protocol shim 304 may yield to the negotiation proxy 302.

Protocol switch 300 may implement at least one worker process. Each worker process may listen on the proxy server ports, accept incoming TCP connection requests from clients, create corresponding TCP connections to servers, monitor the socket descriptors, and orchestrate the operation of protocol modules, such as protocol module 312.

Multiple worker processes can be created and/or forked, in which case they may all accept( ) incoming connections from the shared queues of pending connections on each listening socket. Each worker process may manage multiple client-server communications using I/O multiplexing.

In some embodiments, the system may not support ad-hoc protocol renegotiation. However, a key update may still need to be performed occasionally, so as to avoid reaching cryptographic limits on the amount of plaintext that can be safely encrypted by a given set of keys. Accordingly, in some embodiments, key updates may be arranged by the negotiation proxy 302. Additionally, in some embodiments, in the case of TLS 1.2 (as opposed to TLS 1.3), a full renegotiation may be required to perform a key update.

Policy interface 306 may implement policy, logs, rules, errors, and the like.

The coordinator 308 may implement a main process. Coordinator 308 can coordinate concurrent worker processes, for example by starting and stopping parallel processes.

The UI 310 may implement a UI for access by a user.

Protocol module 312 may implement the protocols. Examples of protocol modules will be described in greater detail in FIG. 8 below.

Figure 4:
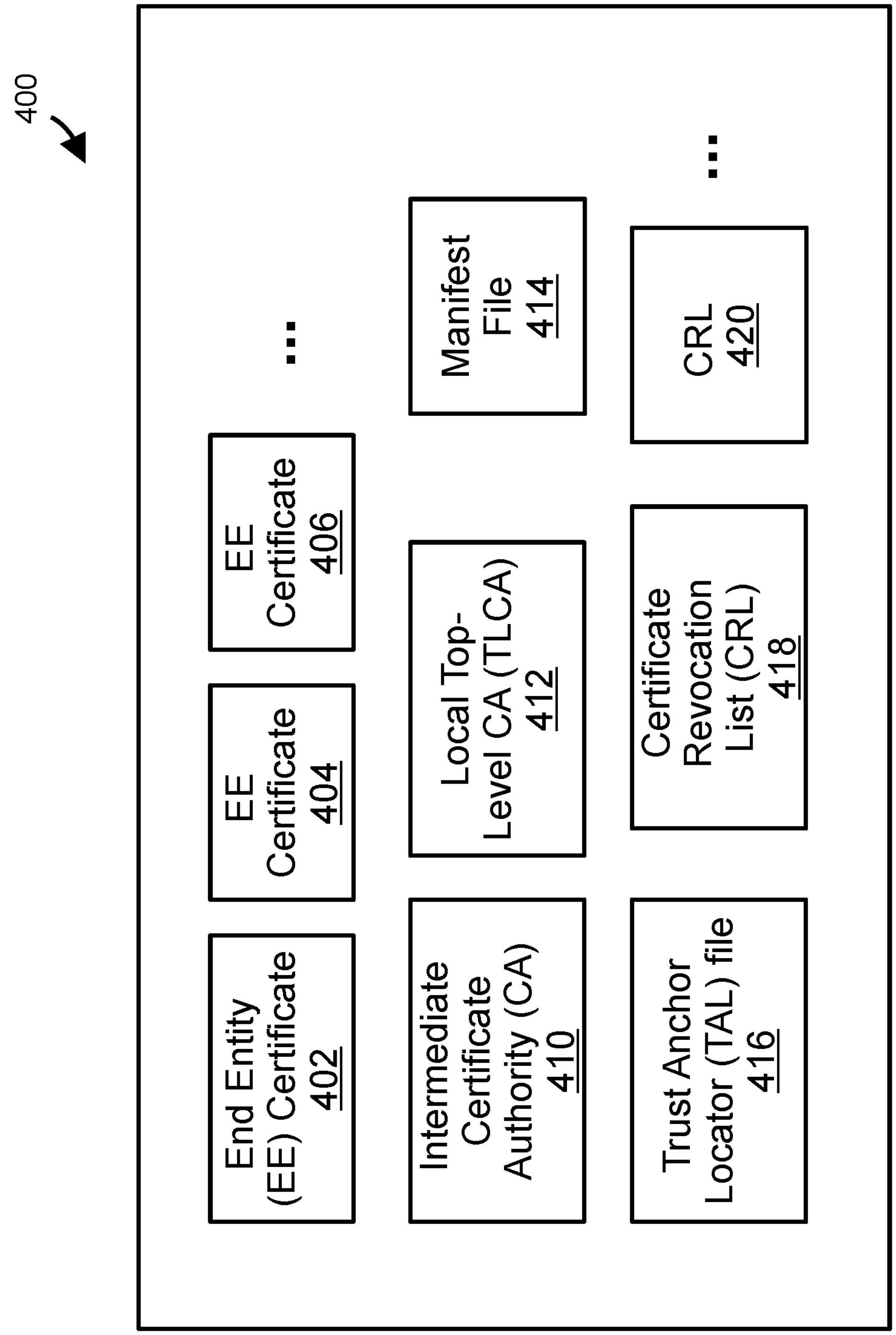
FIG. 4 is a block diagram illustrating a public key infrastructure (PKI) for use with a policy engine, according to an embodiment of the present disclosure.

FIG. 4 is a block diagram illustrating a public key infrastructure (PKI) 400 for use with a policy engine, according to an embodiment of the present disclosure. In some examples, PKI 400 may implement digital objects, such as an intermediate CA 410, to validate a client certificate, as described in this example. In some embodiments, the digital objects included in PKI 400 can perform both PKI-compatible validation and post-quantum-level and/or QPKI validation.

The PKI 400 may have three levels: a top-level certificate authority (CA) 412 that may be a trust anchor, intermediate CAs 410 for each client organization, and end entity (EE) certificates 402-406 for each client endpoint. Having three levels may be advantageous, because a key compromise at one organization does not require revocation of the TLCA 412, only the intermediate CA 410.

The EE certificates 402-406 are X509v3 certificates, so they may contain metadata that may be read by the proxy module (e.g., proxy module 302 of FIG. 3), but are ignored by the servers. This metadata can be encoded in the "organization specific" subset of the Object Identifier (OID) namespace.

The PKI 400 can support a repository. This is a network-facing read-only directory hierarchy containing a Trust Anchor Locator (TAL) 416, intermediate CA certificates 410, an Online Certificate Status Protocol (OCSP) endpoint, Certificate Revocation Lists (CRLs) 418 and 420, and/or a Manifest.

The TAL can be a file 416 named TAL or TAL.txt. If the PKI's local TLCA 412 is to be used as a trust anchor, then the TAL may contain the full path to this file from the repository root. If the PKI's TLCA is not a trust anchor, then the TAL should contain the URL where the TLCA may be found. The PKI can support HTTP(S) access and FTP access to the repository. In some embodiments, the PKI may also support RESTful access. Note that some implementations of openssl require the trust anchor to be self-signed, however openssl version 3.0 may not require this.

The repository can also contain all of the intermediate CA certificates 410, but only one of the intermediate CAs can be valid at any given time. In some examples, the repository must always contain exactly one valid intermediate CA. The PKI 400 may not need to provide the EE certificates, as the path discovery algorithm may not need them. The PKI 400 may not use the text fields in the certificate such as Subject Name (SN) and Organization Unit (OU) for search. Instead, the PKI 400 may use the Subject Key Identifier (ski) and Authority Key Identifier (aki). If aki(C1)=ski(C2) then C2 is the parent of C1. Path discovery can proceed upward (toward the trust anchor), while path validation (signature verification) proceeds downward. Some implementations of SSL, such as openssl, provide an (optional) caching mechanism so that if one OU has many EE children, then the certificate ancestors in a path may be cached locally. In some examples, the disclosed system and methods can preferably use openssl version 1.1.1h, and/or subsequent versions of openssl. In an example, the system will eventually support openssl version 3.0.

Some clients may support OCSP, so the PKI may provide an OCSP endpoint that is synchronized with the repository.

Some clients may not support OCSP. Therefore the PKI may support CRLs. Any CRLs that are created should be present in the repository, such as CRLs 418 and 420 in this example. Note that a CRL identifies the corresponding certificate by its serial number, so the PKI may ensure that all certificates have a globally unique serial number. In an example, serial numbers may be 64 bits in size.

The Manifest can be a file 414 named MANIFEST or MANIFEST.txt that is present in the repository root. Note that the Manifest is an obligatory document, and there must be exactly one Manifest, which must be located in the top level of the repository. The Manifest can list all files in the repository along with their hashes, except the Manifest may not list itself. There is one line per file in the Manifest. Adding files to the repository that are not part of the PKI may be prohibited, except files with a suffix of htm or html (case-insensitive), which may be ignored and may not be listed in the Manifest.

Figure 5A:
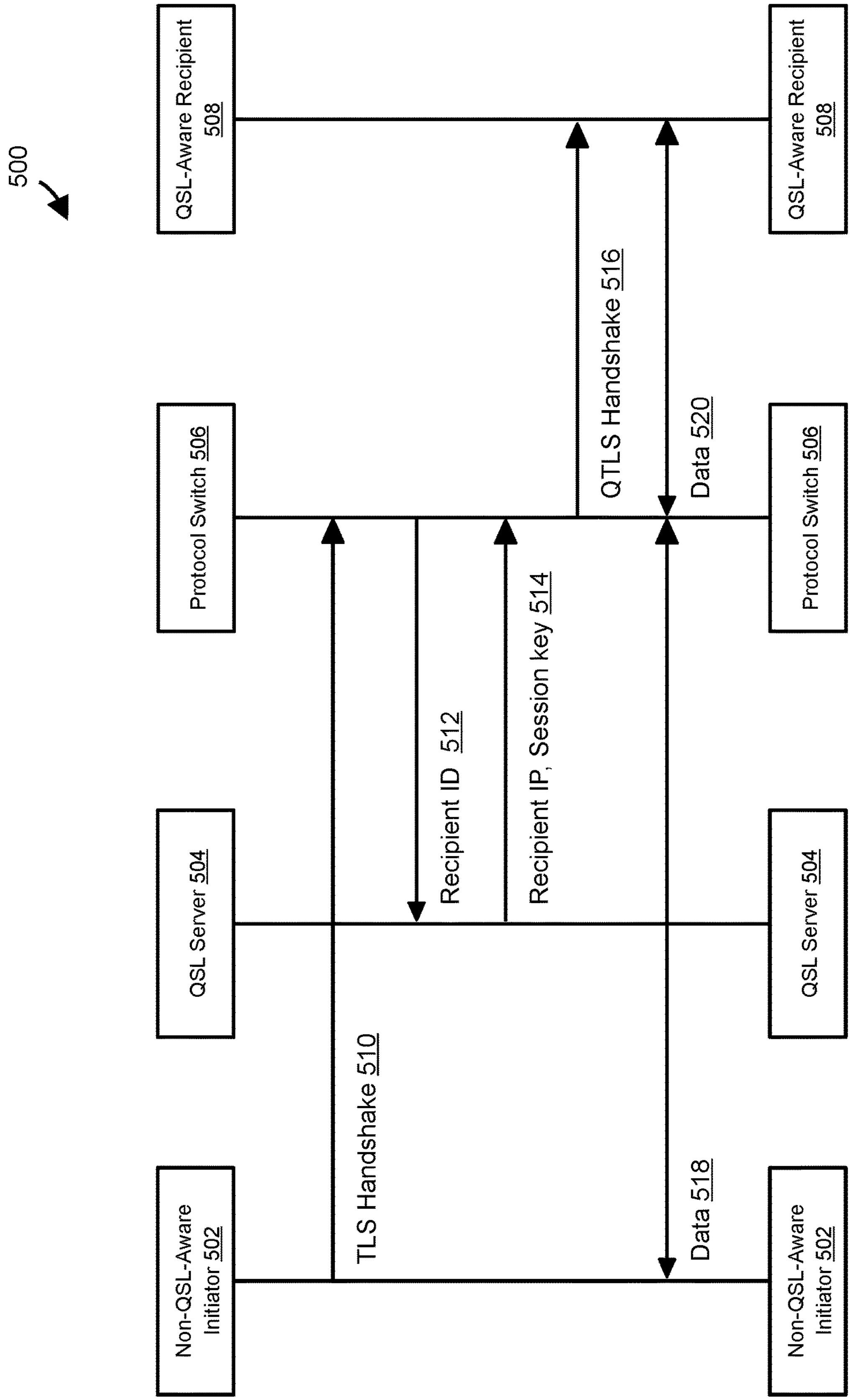
FIG. 5A is a communication flow diagram illustrating translating communication protocols between a non-Quantum Secure Layer (QSL)-aware initiator and a QSL-aware recipient, according to an embodiment of the present disclosure.

FIG. 5A is a communication flow diagram illustrating a method 500 of translating communication protocols between a non-QSL-aware initiator 502 (such as an initiator using a quantum-unsecure communication protocol) and a QSL-aware recipient 508, according to an embodiment of the present disclosure. The method 500 may be performed by a system including a non-QSL-aware initiator 502, a QSL server 504, a protocol switch 506, and a QSL-aware recipient 508. Note that communication between a non-QSL-aware initiator 502 and a QSL-aware recipient 508 is only one possible use of protocol switch 506, and many other examples are described herein, and are not limited by the present disclosure.

In an embodiment, the non-QSL-aware initiator 502 can perform a handshake or negotiation 510 with protocol switch 506. For example, the non-QSL-aware initiator 502 may use a communication protocol such as a TLS version, and accordingly handshake or negotiation 510 may be a TLS handshake. Alternatively, handshake or negotiation 510 may be any other non-QSL-aware handshake.

Because initiator 502 is non-QSL-aware, it is not equipped to negotiate with QSL (or other quantum-secure) components such as QSL server 504. Accordingly, the handshake or negotiation 510 may take place directly between the non-QSL-aware initiator 502 and the protocol switch 506, which then negotiates with other components on behalf of the non-QSL-aware initiator 502. In some examples, negotiation 510 may be implemented within the protocol switch 506 by a proxy module, such as proxy module 302 of the example of FIG. 3 above. An identifier (ID) 512 of the recipient can be derived by the protocol switch 506 from the handshake or negotiation 510.

Next, the protocol switch 506 can send the ID 512 of the recipient 508 to the QSL server 504. In response, the QSL server can locate an IP address for the recipient 508, generate a session key for a newly-established session, and send 514 these to the protocol switch 506. In some embodiments, sending the recipient ID 512 and sending the IP address and session key 514 can be part of the handshake or negotiation between the non-QSL-aware initiator 502 and the protocol switch 506.

Next, the protocol switch 506 can perform a quantum-secure handshake or negotiation 516, such as a QTLS handshake or negotiation, with the QSL-aware recipient 508. In some examples, negotiation 516 may be implemented within the protocol switch 506 by a proxy module, such as proxy module 302 of FIG. 3.

Next, the non-QSL-aware initiator 502 can communicate with protocol switch 506, e.g. sending messages and data 518. Likewise, protocol switch 506 can communicate with QSL-aware recipient 508, e.g. sending messages and data 520. If initiator 502 sends a message 518 to protocol switch 506 in TLS or another non-QSL protocol, protocol switch 506 can then translate to QTLS or to another QSL-aware protocol, and send the translated message 520 to recipient 508. Once the session has been established, recipient 508 can also send messages 520 to protocol switch 506 in QTLS or another QSL-aware protocol, and protocol switch 506 can then translate to TLS or to another non-QSL protocol, and send the translated message 518 to initiator 502.

Note that setting up the session may be asymmetric, whereas the subsequent communication may be symmetric.

That is, operations 510-516 may be irreversible between the initiator 502 and the recipient 508, whereas communication 518 and 520 may be reversible between initiator 502 and recipient 508. Accordingly, as illustrated, communication 518 and 520 may take place in both directions.

Figure 5B:
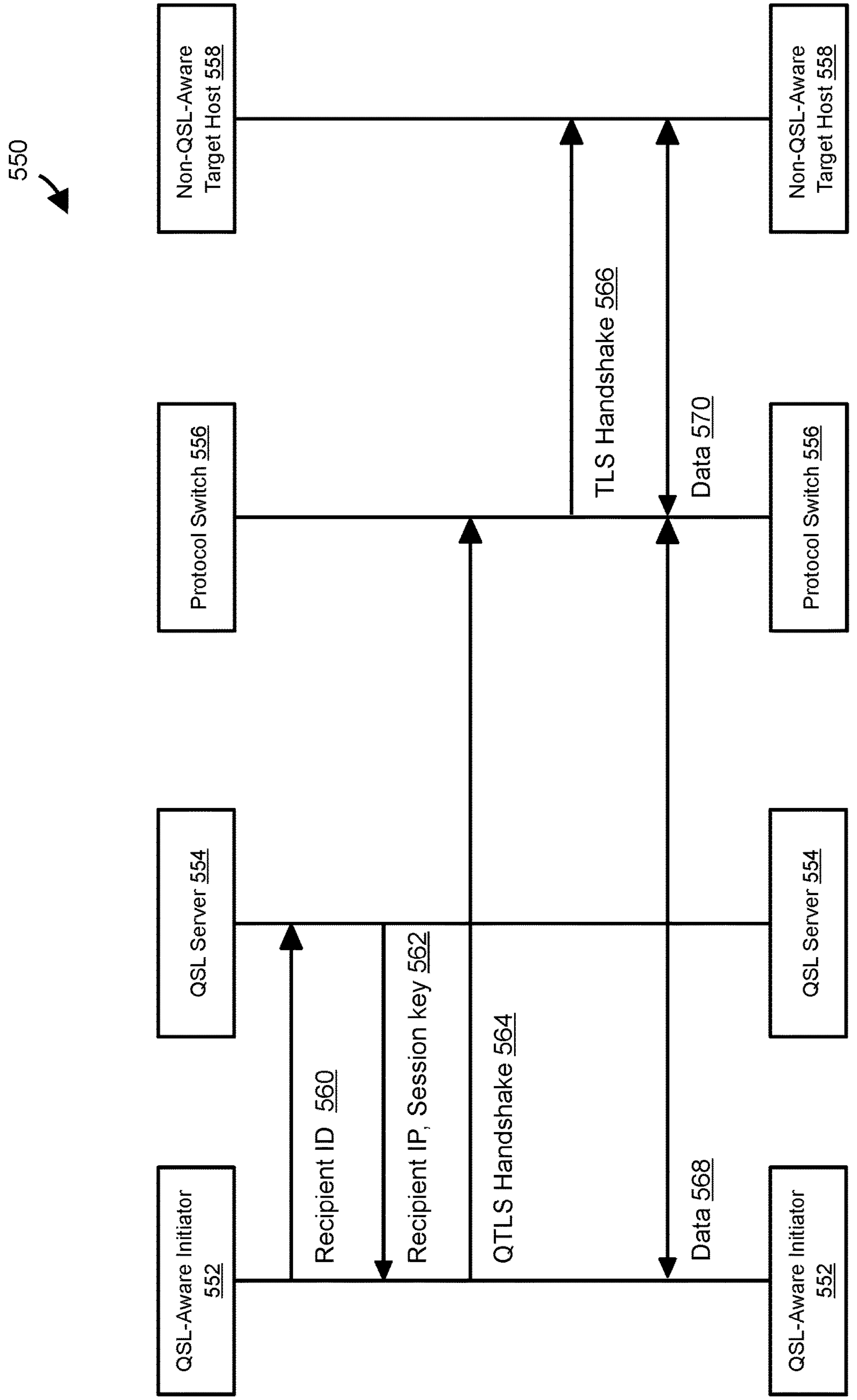
FIG. 5B is a communication flow diagram illustrating translating communication protocols between a QSL-aware initiator and a non-QSL-aware recipient, according to an embodiment of the present disclosure.

FIG. 5B is a communication flow diagram illustrating a method 550 of translating communication protocols between a QSL-aware initiator 552 and a non-QSL-aware target host 558, according to an embodiment of the present disclosure. The method 550 may be performed by a system including a QSL-aware initiator 552, a QSL server 554, a protocol switch 556, and a non-QSL-aware target host 558. Note that communication between a QSL-aware initiator 552 and a non-QSL-aware target host 558 is only one possible use of protocol switch 556, and many other examples are described herein, and are not limited by the present disclosure.

In an embodiment, the QSL-aware initiator 552 can send an ID 560 of the protocol switch 556 to the QSL server 554. In response, the QSL server can locate an IP address for the protocol switch 556, generate a session key for a newly-established session, and send 562 these to the QSL-aware initiator 552. In some embodiments, sending the ID 560 and sending the IP address and session key 562 can be part of the handshake or negotiation between the QSL-aware initiator 552 and the protocol switch 556.

In this example, initiator 552 is QSL-aware, so it can communicate and/or negotiate with QSL (or other quantum-secure) components, such as the QSL server 554. This is the source of the asymmetry, i.e. the difference between FIGS. 5A and 5B. As in the example of FIG. 5A, initiating the session in the example of FIG. 5B is asymmetric, whereas the subsequent communication can be symmetric. That is, operations 560-566 may be irreversible between the initiator 552 and the target host 558, whereas communication 568 and 570 may be reversible between initiator 552 and target host 558.

In some embodiments, because the target host 558 is non-QSL-aware, it cannot have an ID on the QSL server. The initiator 552 may use other means (such as SNI) to indicate to the protocol switch the target host 558 to which initiator 552 seeks to connect. Alternatively, the target host may be determined by the policy engine.

Next, a QTLS handshake or negotiation 564 may take place between the QSL-aware initiator 552 and the protocol switch 556. Negotiation 564 may be implemented within the protocol switch 556 by a proxy module, such as proxy module 302 of the example of FIG. 3 above.

Next, the protocol switch 556 can perform a handshake or negotiation 566 with non-QSL-aware target host 558. For example, the non-QSL-aware target host 558 may use a communication protocol such as a TLS version, and accordingly handshake or negotiation 566 may be a TLS handshake or another non-QSL-aware handshake. In some examples, handshake or negotiation 566 may be implemented within the protocol switch 556 by a proxy module.

Next, the QSL-aware initiator 552 can communicate with protocol switch 556, e.g. sending messages and data 568. Likewise, protocol switch 556 can communicate with non-QSL-aware target host 558, e.g. sending messages and data 570. If initiator 552 sends a message 568 to protocol switch 556 in QTLS or another QSL-aware protocol, protocol switch 556 can then translate to TLS or to another non-QSL protocol, and send the translated message 570 to target host 558. Once the session has been established, target host 558 can also send messages 570 to protocol switch 556 in TLS or another non-QSL protocol, and protocol switch 556 can then translate to QTLS or to another QSL-aware protocol, and send the translated message 568 to initiator 552.

As in the example of FIG. 5A, setting up the session may be asymmetric, whereas subsequent communication may be symmetric. In particular, operations 560-566 may be irreversible between the initiator 552 and the target host 558, whereas communication 568 and 570 may be reversible between initiator 552 and target host 558. Accordingly, communication 568 and 570 may take place in both directions.

Figure 6:
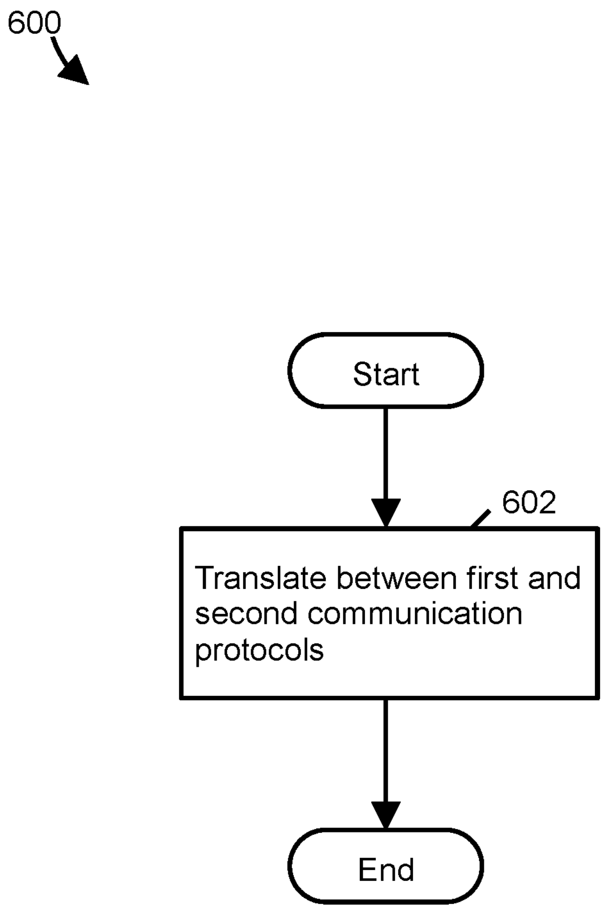
FIG. 6 is a flow diagram illustrating a method of switching between communication protocols, according to an embodiment of the present disclosure.

FIG. 6 is a flow diagram illustrating a method 600 of switching between communication protocols, according to an embodiment of the present disclosure. In various examples, the method 600 may be implemented by a protocol switch, such as the protocol switch 102 of the example of FIG. 1A above.

In this example, the method 600 can start with the protocol switch translating 602 between first and second communication protocols. The translating can comply with standards of the first communication protocol and/or the second communication protocol, for example unicity standards and/or other standards. For example, the unicity standard of a given communication protocol may specify that direct connections are only supported with the same communication protocol, and/or only supported with the same version of the same communication protocol.

For example, the first communication protocol can include a TLS protocol; an IMAP; an HTTP or HTTPS; a QSL protocol; a PQTLS protocol; a hybrid protocol; or another secure protocol. For example, in the case where the first communication protocol is a TLS protocol, it may include TLS version 1.2, TLS version 1.3, or a subsequent TLS version. In the case where the first communication protocol is an IMAP, it may include IMAP4, IMAP2bis, IMAP2, or another IMAP version.

The second communication protocol may differ from the first communication protocol. For example, the second communication protocol can comprise a different at least one of: a TLS protocol; an IMAP; an HTTP or HTTPS; a QSL protocol; a PQTLS protocol; a hybrid protocol; or another secure protocol. For example, in the case where the second communication protocol is a TLS protocol, it may include a different one of TLS version 1.2, TLS version 1.3, or a subsequent TLS version from the first protocol. In the case where the second communication protocol is an IMAP, it may include a different one of IMAP4, IMAP2bis, IMAP2, or another IMAP version from the first protocol. Alternatively, in some examples, the second communication protocol may be unsecured communication, such as plaintext.

Note that, in some embodiments, the communication may proceed in either direction, and/or both directions, between the first and second communication protocols. For example, if the first protocol is a legacy TLS protocol and the second protocol is a quantum-secure protocol, the disclosed method 600 can involve translating 602 from the legacy TLS protocol to the quantum-secure protocol, and/or translating 602 from the quantum-secure protocol to the legacy TLS protocol.

In some examples, translating 602 between the first and second communication protocols may involve decrypting and re-encrypting a message, as described in the example of FIG. 7 below.

The method 600 may then end.

Figure 7:
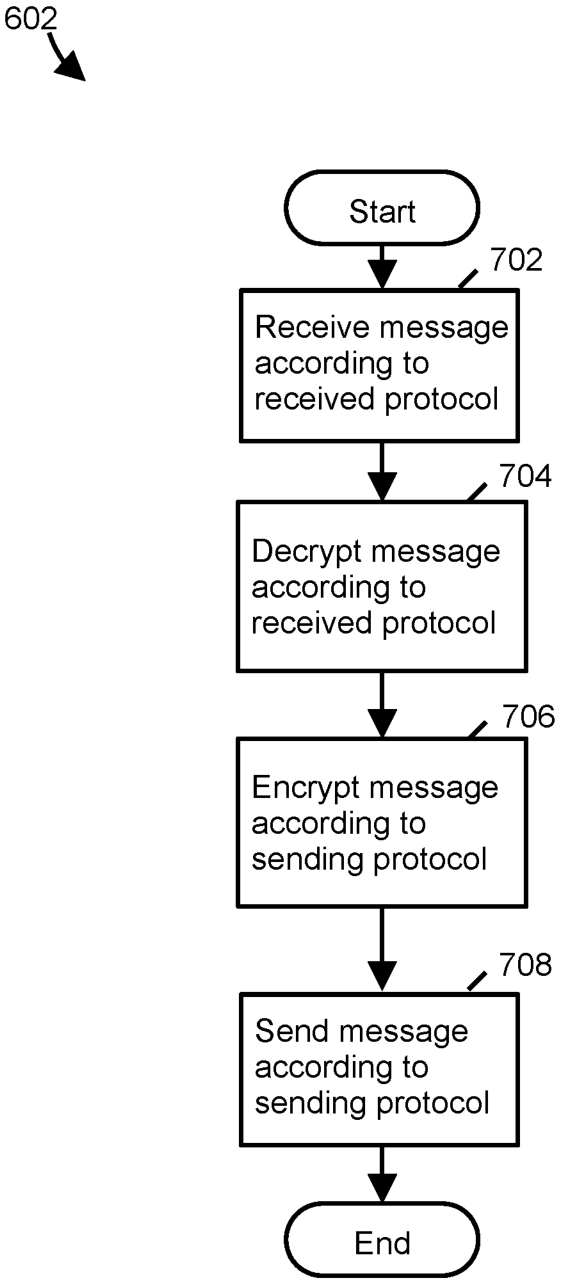
FIG. 7 is a flow diagram illustrating details of a method of switching between communication protocols, according to an embodiment of the present disclosure.

FIG. 7 is a flow diagram illustrating details of a method 602 of switching between communication protocols, according to an embodiment of the present disclosure. In some examples, the method 602 may provide additional details of the operation 602 of method 600 in the example of FIG. 6 above. Alternatively or additionally, operation 602 of method 600 may be implemented by another method, and is not limited by the present disclosure.

In some examples, the method 602 may be implemented by a protocol switch, such as protocol switch 102 of the example of FIG. 1A above. For example, the protocol switch may switch between a first communication protocol used to communicate with a first computing device and a second communication protocol used to communicate with a second computing device, as in the example of FIG. 1A above. In an embodiment, the method 602 can be used to translate between the two communication protocols in either direction, that is, to translate either from the first to the second communication protocol (if the first computing device is the initiator of a message and the second computing device is the recipient), or from the second to the first communication protocol (if the second computing device is the initiator and the first computing device is the recipient). In some embodiments, the first and second computing devices may engage in a dialogue, and therefore may at different times be both initiators and recipients of messages.

In this example, the method 602 can start with the protocol switch receiving 702 a message according to a first protocol, which will be referred to as the received protocol, from the initiator. The received protocol may be either the first communication protocol or the second communication protocol, depending whether the first or second computing device is the initiator, respectively. In some embodiments, the protocol switch may communicate with the initiator solely using the received protocol. This can enable the initiator to comply with standards of the received protocol, including any unicity standards, even when the second protocol, which will be referred to as the sending protocol, differs from the received protocol.

Next, the protocol switch can decrypt 704 the message according to the received protocol. Once the message has been decrypted, the protocol switch itself can access the message, for example in plain text. This access enables the protocol switch to re-encrypt the message in another protocol, in particular in the sending protocol, even while allowing both the initiator and recipient computing devices to comply with any unicity standards of their respective protocols.

In some embodiments, the protocol switch can also send the message to a security appliance, such as a firewall, an anti-virus system, a content filtering device, an intrusion detection appliance, or the like. For example, the security appliance can perform logging and/or inspection of the message, and can optionally return a response to the protocol switch, such as a clearance to proceed. In some embodiments, the protocol switch sends the message to the security appliance using an API. In some embodiments, the protocol switch sends the message in plaintext after decrypting 704 the message according to the received protocol. However, the message may remain secure because the security appliance can be located within the same LAN as the protocol switch, and/or have a trust relationship with the protocol switch.

Next, the protocol switch can encrypt 706 the message according to the sending protocol. The sending protocol may be either the second communication protocol or the first communication protocol, depending whether the second or first computing device is the recipient, respectively.

Next, the protocol switch can send 708 the message encrypted according to the sending protocol to the recipient. In some embodiments, the protocol switch may communicate with the recipient solely using the sending protocol. This can enable the recipient to comply with standards of the received protocol, including any unicity standards, even when the received protocol differs from the sending protocol.

The method 602 may then end.

Figure 8:
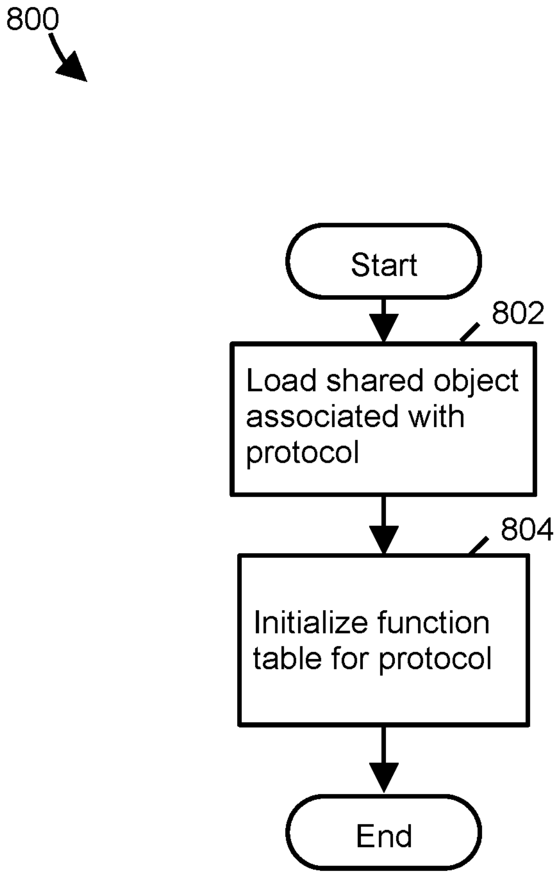
FIG. 8 is a flow diagram illustrating a method of preparing a protocol module for use while switching between communication protocols, according to an embodiment of the present disclosure.

FIG. 8 is a flow diagram illustrating a method 800 of preparing a protocol module for use while switching between communication protocols, according to an embodiment of the present disclosure. In various examples, the method 800 may be implemented by a protocol switch, such as the protocol switch 102 of the example of FIG. 1A above, by a server, such as a QSL server, or by another computing device. The method 800 may provide additional details of operations 704 and/or 706 of the method 602 of FIG. 7 above.

In this example, the method 800 can start with the protocol switch loading 802 a shared library object associated with a protocol (such as the received protocol, the sending protocol, an intermediate protocol, or the like). In particular, protocol modules can be packaged as shared library objects or Dynamic-Link Libraries (DLLs) that export an API. The protocol modules can communicate through the API with a caller, such as a proxy or a test jig.

Each protocol module can provide an implementation of one or more protocols, such as TLS 1.2, TLS 1.3, QSL, IMAP, etc. In an embodiment, each protocol module can support multiple protocol instances. Loading 802 a shared library object and/or protocol modules provides modularity, and accordingly a caller can use the module without access to the particular protocol's details. For example, the modules may be maintained and/or distributed as binary modules rather than source code. This enables a given protocol to be maintained as a proprietary secret. For example, a particular customer can implement a proprietary communication protocol as a binary module that is compatible with the protocol switch, thereby enabling the customer to use and interact with the protocol switch, without revealing details of the protocol.

Next, the protocol switch can initialize 804 a function table for the protocol.

Once the shared library object has been loaded 802 and the corresponding function table initialized 804, the corresponding protocol module can be used, for example to create one or more sessions. In some embodiments, before a protocol can be used, it should be initialized. The protocol can optionally also be configured. In some embodiments, when the protocol is no longer necessary, the protocol instance should be finalized. Initializing, configuring, and finalizing a protocol are described in FIG. 9 below.

The method 800 may then end.

Figure 9:
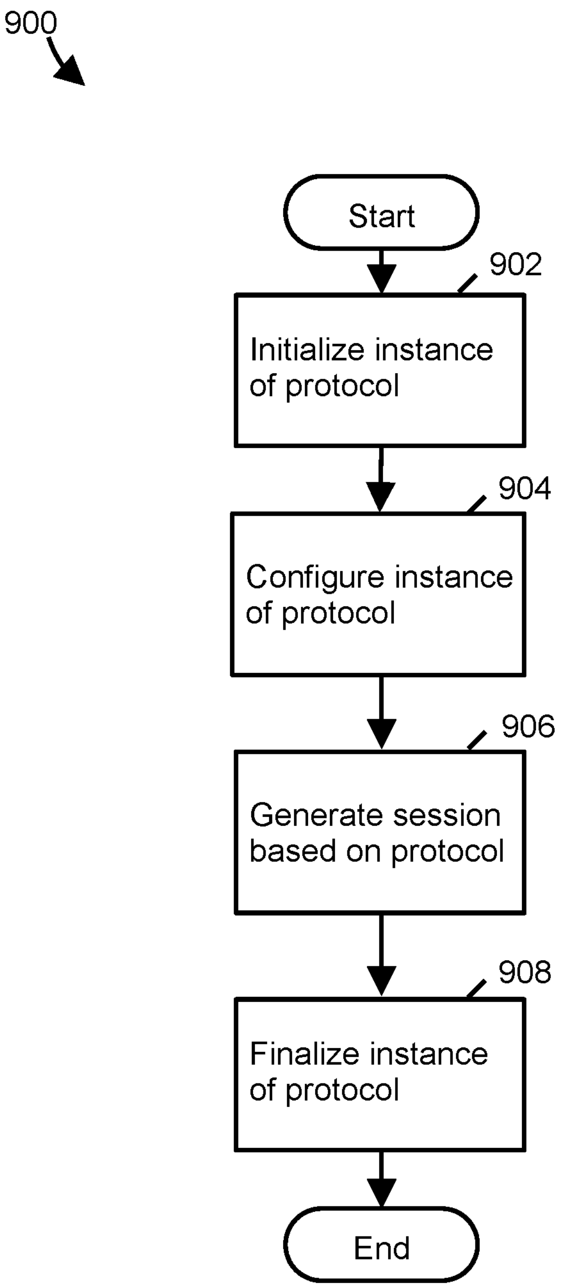
FIG. 9 is a flow diagram illustrating a method of using a protocol module while switching between communication protocols, according to an embodiment of the present disclosure.

FIG. 9 is a flow diagram illustrating a method 900 of using a protocol module while switching between communication protocols, according to an embodiment of the present disclosure. In various examples, the method 900 may be implemented by a protocol switch, such as the protocol switch 102 of the example of FIG. 1A above, by a server, such as a QSL server, or by another computing device. For example, the method 900 may represent calls that may be made by a protocol switch or computing device, and received and/or implemented by a protocol module while translating between protocols. The method 900 may provide additional details of operations 704 and/or 706 of the method 602 of FIG. 7 above.

Note that, in some examples, the protocol switch or computing device may perform each individual step of the method 900, for example by calling a respective function or method corresponding to each respective step of method 900. These function or method calls may be received and optionally implemented by a particular communications protocol, for example by a protocol module implementing the particular protocol. However, in some examples, the individual steps of method 900 may be optionally ignored by a particular protocol, or by a protocol module implementing the protocol. For example, a particular protocol module may provide callable functions or methods for each step of method 900, but may not implement any instructions for individual steps that are ignored. For example, some protocols may not require configuration, and therefore some protocol modules may not implement instructions to configure 904 a protocol instance. Alternatively, some protocol modules may implement instructions for all the steps of method 900.

In this example, the method 900 can start with the protocol switch or computing device initializing 902 an instance of a protocol (such as the received protocol, the sending protocol, an intermediate protocol, or the like). Each protocol module can support multiple protocol instances. In some embodiments, before a protocol is used, it should be initialized. For example, memory can be allocated for the protocol.

Next, the protocol switch or computing device can configure 904 an instance of the protocol.

Next, the protocol switch or computing device can generate 906 a session based on the protocol. The protocol module can create a session object for a given connection (file descriptor).

In some embodiments, a session may be a non-blocking state machine, or a coroutine, responsible for negotiation (if applicable to the given protocol), data transfer, re-negotiation (if allowed by the protocol instance configuration), etc. Such details may be encapsulated within the state machine, and thus may not be visible to the caller. The session can transmit data in both directions (e.g., handshake, renegotiation, etc.). When the session state machine returns control, it may have produced or consumed some application data. The session can also tell the caller whether it should be activated again, and when, with respect to the file descriptor state (readable/writable).

Efficient implementations of non-blocking session state machines can rely on the caller to wait until the session's file descriptor becomes readable or writable, and only then return control back to the session coroutine.

To support more complicated scenarios such as SNI, client certificates, etc., a generic callback mechanism can be provided. For example, the mechanism may be based on standard TLS extensions, but can be adjusted or redesigned as needed while following the general idea that additional information may become available during the operation of the session state machine. TLS extension data can be either analyzed by the callback recipient (e.g. in the case of SNI), or it can be relayed to the other party (e.g. in the case of client certificate).

Next, the protocol switch or computing device can finalize 908 an instance of the protocol. For example, when it is no longer needed, the protocol instance can be finalized 908 by notifying a peer to close a connection.

The method 900 may then end.

Figure 10:
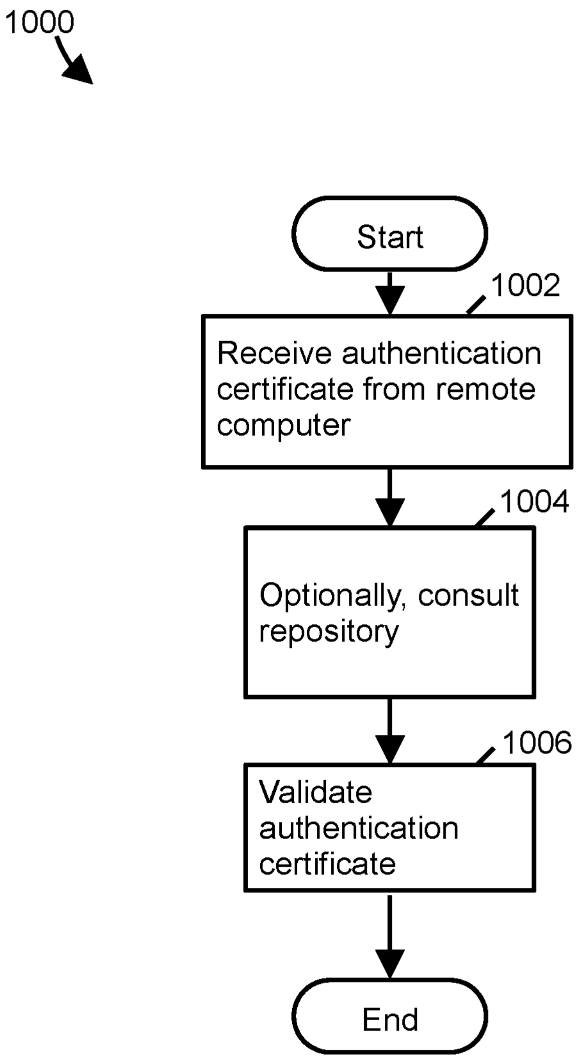
FIG. 10 is a flow diagram illustrating a method of using a PKI while switching between communication protocols, according to an embodiment of the present disclosure.

FIG. 10 is a flow diagram illustrating a method 1000 of validating a client certificate using a PKI while switching between communication protocols, according to an embodiment of the present disclosure. In various examples, the method 1000 may be implemented by a PKI (such as PKI 242 and PKI 400 of the examples of FIGS. 2C and 4 above), by an intermediate CA or digital objects associated with a PKI (such as intermediate CA 410 and other digital objects of the example of FIG. 4 above), by a server, by a protocol switch, and/or by another computing device (such as computing device 1300 of FIG. 13 below). In some examples, the intermediate CA may be hosted on a server and/or may be executed on the same computing device as the protocol switch. In some embodiments, the PKI or intermediate CA can use digital objects that can perform standard or legacy PKI-compatible validation as well as post-quantum-level and/or QPKI validation.

In this example, the method 1000 can start with the PKI, intermediate CA, server, or other computing device receiving 1002 an authentication certificate from a remote computer.

Next, the PKI, intermediate CA, server, or other computing device can optionally consult 1004 a repository containing an EE certificate for the remote computer and a CA that has signed the EE certificate. The repository may be a network-facing read-only directory hierarchy containing a TAL, intermediate CA certificates, an OCSP endpoint, CRLs, and/or a Manifest, as described in the example of FIG. 4.

Next, the PKI, intermediate CA, server, or other computing device can validate 1006 the authentication certificate. The PKI, intermediate CA, server, or other computing device can use a PKI and/or the digital objects of the PKI, as described in the example of FIG. 4 above, to validate the authentication certificate. For example, the digital objects may include the repository, EE certificates, TAL, intermediate CA certificates, OCSP endpoint, CRLs, and/or Manifest, as in operation 1004, and/or any other digital objects, such as those described in the example of FIG. 4.

The method 1000 may then end.

Figure 11:
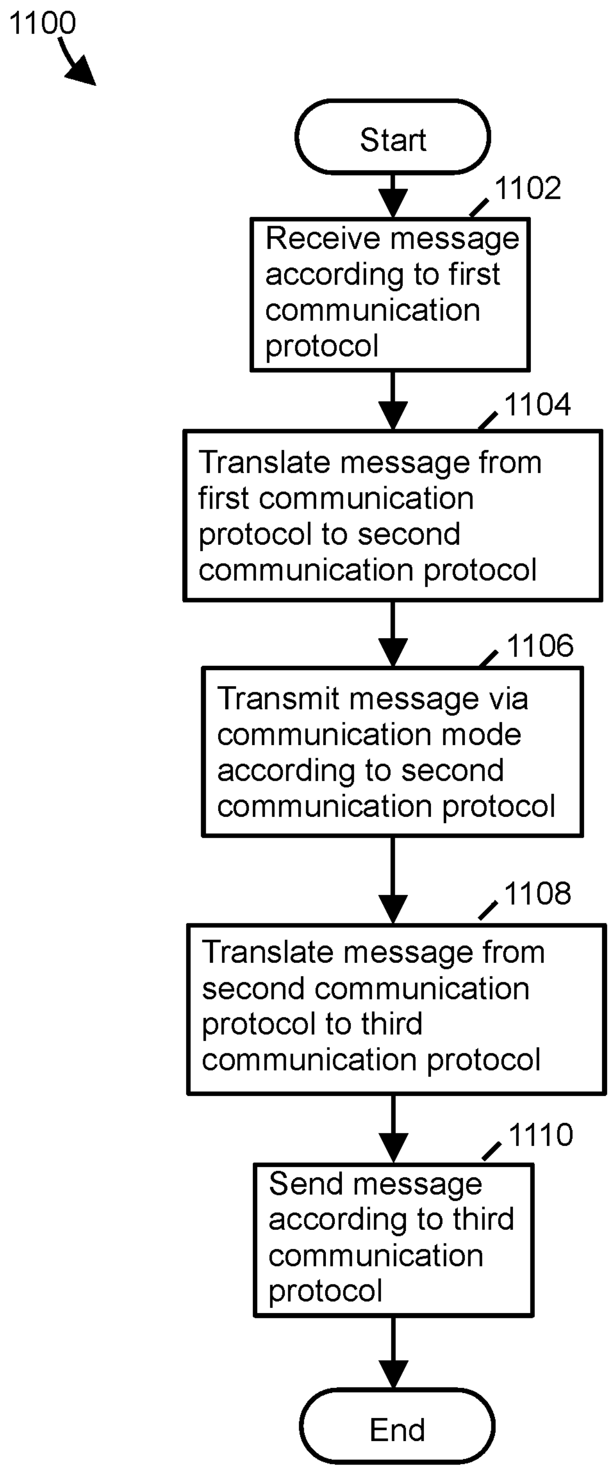
FIG. 11 is a flow diagram illustrating a method for secure universal communication between two endpoints that use different communication protocols, such as legacy protocols, according to an embodiment of the present disclosure.

FIG. 11 is a flow diagram illustrating a method 1100 for secure universal communication between two endpoints that use different communication protocols, such as legacy protocols, according to an embodiment of the present disclosure. In an example, the method 1100 may be implemented by a pair of protocol switches, which may be referred to as two relays or as a two-relay configuration, such as the two-relay configuration 200 of the example of FIG. 2A above. Alternatively, in various embodiments, the method 1100 may be implemented by a single protocol switch, or by any other number of protocol switches, and is not limited by the present disclosure.

In this example, the method 1100 can start with a first relay of the two-relay configuration receiving 1102 a message from a first endpoint according to a first communication protocol. In various embodiments, the first communication protocol can include a QSL protocol, a PQTLS protocol, TLS version 1.2, TLS version 1.3, a subsequent TLS version, IMAP4, IMAP2bis, IMAP2, another IMAP version, HTTP, HTTPS, another secure protocol, a hybrid protocol, or unsecured communication. In some embodiments, the communication between the first endpoint and the first relay may be secure even if a legacy protocol (such as TLS or another quantum-unsecure protocol) or unsecured communication is used, for example because the first endpoint may be located within the same LAN as the first relay.

Next, the first relay can translate 1104 the message from the first communication protocol to a second communication protocol. In some embodiments, the second communication protocol can be a quantum-secure channel. For example, the second communication protocol may be a QSL or a PQTLS protocol. Accordingly, the two-relay configuration can be used to enable endpoint devices configured to communicate via legacy protocols to nevertheless make use of a quantum-secure channel. Accordingly, method 1100 can provide quantum-secure universal communication even between two endpoints that use legacy protocols. Translating 1104 the message may involve decrypting and re-encrypting the message, as in the example of FIG. 12A below.

Next, the first relay can transmit 1106 the message according to the second communication protocol. In particular, the first relay may transmit the message to the second relay of the two-relay configuration. In various embodiments, the message may be transmitted via a communication mode such as a network, wireless communication, radio-frequency (RF) communication, a communication line, and/or free-space optical communication.

In some embodiments, the communication mode can be unsecured or public, such as the Internet, a public wi-fi hotspot, another public network, and the like. The second communication protocol can protect the message even when it is transmitted via an unsecured communication mode. If the second communication protocol is quantum-secure, it can protect the message even against a quantum attack. Accordingly, while messages are in transit using the disclosed system and methods between the first and second relays, in either direction, the messages can remain secure against non-classical attacks, for example attacks with quantum computers.

Alternatively, in some embodiments, the second protocol is not necessarily a quantum-secure protocol, and is not limited by the present disclosure. For example, the disclosed two-relay configuration may be used to enable clients to communicate with servers despite using out of date communication protocols.

Next, the method may further comprise the second relay translating 1108 the message from the second communication protocol to a third communication protocol. Translating 1108 the message from the second to the third communication protocol may involve decrypting and re-encrypting the message, as in the example of FIG. 12B below.

Next, the second relay can send 1110 the message to a second endpoint according to the third communication protocol. In various embodiments, the third communication protocol can include a QSL protocol, a PQTLS protocol, TLS version 1.2, TLS version 1.3, a subsequent TLS version, IMAP4, IMAP2bis, IMAP2, another IMAP version, HTTP, HTTPS, another secure protocol, a hybrid protocol, or unsecured communication. In an example, even if the third communication protocol is a legacy or unsecured protocol, this last stage of communication might still be secure, because the second relay may be located within the same LAN as the second endpoint. In some examples, the third communication protocol differs from the first protocol, but this is not necessarily the case. In an alternative example, the first and third protocols might be the same quantum-unsecure protocol, while the second protocol might be quantum-secure. In such an example, method 1100 would thereby provide quantum-secure communication between two endpoints configured to use legacy protocols.

In this example, both endpoints can communicate using legacy protocols, while strictly complying with unicity standards of the legacy protocols, and yet their communication can be secured by a quantum-secure protocol between the two relays. For example, this can be accomplished by the relays decrypting and re-encrypting the message according to the various protocols, as described in the examples of FIGS. 12A and 12B below.

The method 1100 may then end.

Figure 12A:
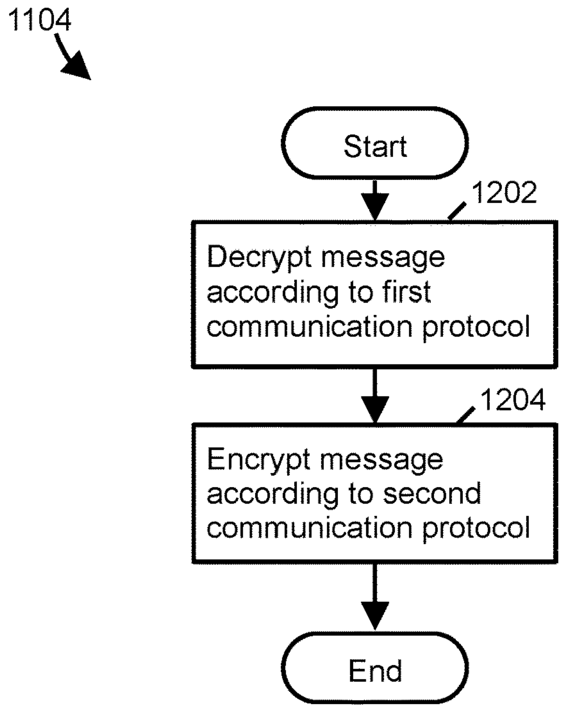
FIG. 12A is a flow diagram illustrating a method of switching between a first and an intermediate communication protocol while enabling endpoints using different protocols to communicate securely, according to an embodiment of the present disclosure.

FIG. 12A is a flow diagram illustrating a method 1104 of switching between a first and an intermediate communication protocol while enabling endpoints using different protocols to communicate securely, according to an embodiment of the present disclosure. In some examples, the method 1104 may provide additional details of the operation 1104 of method 1100 in the example of FIG. 11 above. Alternatively or additionally, operation 1104 of method 1100 may be implemented by another method, and is not limited by the present disclosure.

In an example, the method 1104 may be implemented by the first relay of the relays of FIG. 11 above or of the two-relay configuration 200 of the example of FIG. 2A above. In another example, the method 1104 may be implemented by a protocol switch, and is not limited by the present disclosure.

In this example, the method 1104 can start with the first relay decrypting 1202 the message according to the first communication protocol. Once the message has been decrypted, the first relay itself can access the message, for example in plain text. This access enables the relay to re-encrypt the message in another protocol, in particular in the intermediate or second protocol, even while allowing both the initiator and recipient computing devices to comply with any unicity standards of their respective protocols. For example, a respective communication protocol's unicity standard may specify that direct connections are only supported with the same protocol, and/or with the same version of the protocol. The initiator and recipient devices can comply with these respective unicity standards, even while communicating with each other via the disclosed relays.

As in the example of FIG. 7, the first relay can optionally send the message to a first security appliance, such as a firewall, an anti-virus system, a content filtering device, an intrusion detection appliance, or the like. For example, the security appliance may perform logging and/or inspection of the message, and may optionally return a response to the relay. In some embodiments, the first relay sends the message to the security appliance in plaintext, after decrypting 1202 the message using the first protocol but before encrypting 1204 the message using the second protocol. The first security appliance may be located within the same LAN as the first relay, and/or have a trust relationship with the first relay, so the message may remain secure.

Next, the first relay can encrypt 1204 the message according to the intermediate or second protocol.

The method 1104 may then end.

Figure 12B:
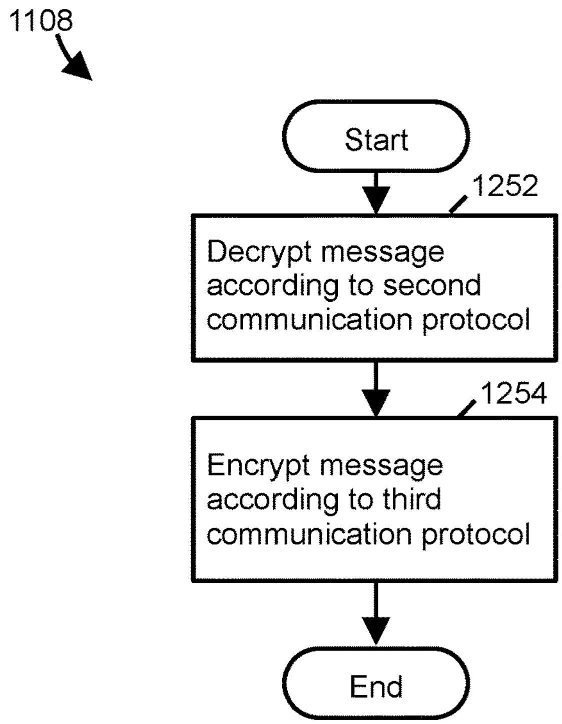
FIG. 12B is a flow diagram illustrating a method of switching between an intermediate and a third communication protocol while enabling endpoints using different protocols to communicate securely, according to an embodiment of the present disclosure.

FIG. 12B is a flow diagram illustrating a method of switching between an intermediate and a third communication protocol while enabling endpoints using different protocols to communicate securely, according to an embodiment of the present disclosure. In some examples, the method 1108 may provide additional details of the operation 1108 of method 1100 in the example of FIG. 11 above. Alternatively or additionally, operation 1108 of method 1100 may be implemented by another method, and is not limited by the present disclosure.

In an example, the method 1108 may be implemented by the second relay of the relays of FIG. 11 above or of the two-relay configuration 200 of the example of FIG. 2A above. In another example, the method 1108 may be implemented by a protocol switch, and is not limited by the present disclosure.

In this example, the method 1108 can start with the second relay decrypting 1252 the message according to the intermediate or second communication protocol. Once the message has been decrypted, the second relay itself can access the message, for example in plain text. This access enables the second relay to re-encrypt the message in another protocol, in particular in the third protocol, even while allowing both the initiator and recipient computing devices to comply with any unicity standards of their respective protocols.

In some embodiments, the second relay can optionally send the message to a second security appliance, e.g. to perform logging and/or inspection of the message. The second security appliance may optionally return a response to the second relay. In some embodiments, the second relay sends the message to the second security appliance in plaintext, after decrypting 1252 the message using the second protocol but before encrypting 1254 the message using the third protocol. The second security appliance may be located within the same LAN as the second relay, and/or have a trust relationship with the second relay, so the message may remain secure.

Next, the second relay can encrypt 1254 the message according to the third protocol.

The method 1108 may then end.

Figure 13:
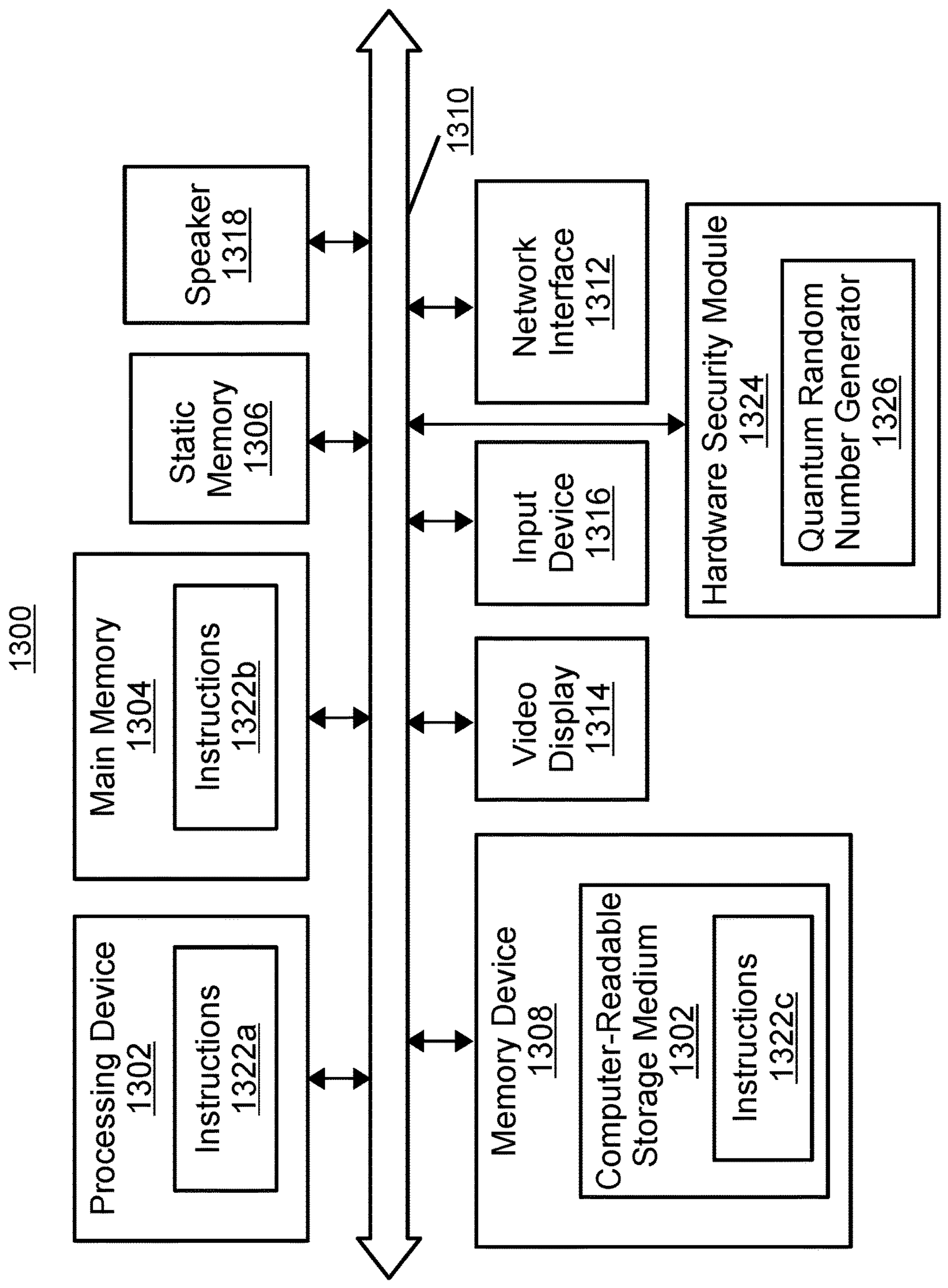
FIG. 13 is a block diagram of an example computer system which can perform any one or more of the methods described herein, in accordance with one or more aspects of the present disclosure.

FIG. 13 is a block diagram of an example computer system 1300 which can perform any one or more of the methods described herein, in accordance with one or more aspects of the present disclosure. In one example, the computer system 1300 may include a computing device and correspond to one or more of the receiving endpoints 276-280 (such as servers), the initiating endpoints 268-272 (such as clients), or any suitable component of FIGS. 1A-1B and 2A-2C. The computer system 1300 may be connected (e.g., networked) to other computer systems in a local area network (LAN), an intranet, an extranet, or the Internet, including via the cloud or a peer-to-peer network. The computer system 1300 may operate in the capacity of a server in a client-server network environment. The computer system 1300 may be a personal computer (PC), a tablet computer, a wearable (e.g., wristband), a set-top box (STB), a personal Digital Assistant (PDA), a mobile phone, a smartphone, a camera, a video camera, an Internet of Things (IoT) device, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1300 (one example of a "computing device") illustrated in FIG. 13 includes a processing device 1302, a main memory 1304 (e.g., read-only memory (ROM), flash memory, solid state drives (SSDs), dynamic random-access memory (DRAM) such as synchronous DRAM (SDRAM)), a static memory 1306 (e.g., flash memory, solid state drives (SSDs), or static random-access memory (SRAM)), and a memory device 1308, wherein any of the foregoing may communicate with each other via a bus 1310. In some implementations, the computer system 1300 may further include a hardware security module (not shown).

The processing device 1302 represents one or more general-purpose processing devices such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a system on a chip, a field programmable gate array (FPGA), a digital signal processor (DSP), network processor, or the like. The processing device 1302 may be configured to execute instructions for performing any of the operations and steps discussed herein.

The computer system 1300 illustrated in FIG. 13 further includes a network interface device 1312. The computer system 1300 also may include a video display 1314 (e.g., a liquid crystal display (LCD), a light-emitting diode (LED), an organic light-emitting diode (OLED), a quantum LED, a cathode ray tube (CRT), a shadow mask CRT, an aperture grille CRT, or a monochrome CRT), one or more input devices 1316 (e.g., a keyboard and/or a mouse or a gaming-like control), and one or more speakers 1318 (e.g., a speaker). In one illustrative example, the video display 1314 and the one or more input devices 1316 may be combined into a single component or device (e.g., an LCD touch-screen).

The memory device 1308 may include a computer-readable storage medium 1302 on which the instructions **1322*c* embodying any one or more of the methods, operations, or functions described herein are stored. The instructions 1322*c* may also reside, completely or at least partially, within the main memory 1304 as instructions 1322*b* and/or within the processing device 1302 during execution thereof by the computer system 1300. As such, the main memory 1304 or as instruction 1322*a* and the processing device 1302 also constitute computer-readable media. The instructions 1322 may further be transmitted or received over a network via the network interface device 1312**.

While the computer-readable storage medium 1320 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium capable of storing, encoding or carrying out a set of instructions for execution by the machine and that cause the machine to perform any one or more of the methods disclosed herein. The term "computer-readable storage medium" shall accordingly be taken to include, but not be limited to, solid-state memories, optical media, and magnetic media.

While the computer system environment of 1300 shows the basic components the addition of a Hardware Security Module 1324 associated with a Quantum Random Number Generator 1326 are added to complete the entropy required for Post Quantum computations and interactions. The use of these components is critical as described previously in the overall methods used for this system.

No part of the description in this application should be read as implying that any particular element, step, or function is an essential element that must be included in the claim scope. The scope of patented subject matter is defined only by the claims. Moreover, none of the claims is intended to invoke 25 U.S.C. § 104(f) unless the exact words "means for" are followed by a participle.

The foregoing description, for purposes of explanation, use specific nomenclature to provide a thorough understanding of the described embodiments. However, it should be apparent to one skilled in the art that the specific details are not required to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Once the above disclosure is fully appreciated, numerous variations and modifications will become apparent to those skilled in the art. It is intended that the following claims be interpreted to embrace all such variations and modifications.

What is claimed is:

1. A method of secure communication, comprising:

receiving, at a first relay computing device, a message from a first endpoint according to a first communication protocol;

translating, by the first relay computing device, the message from the first communication protocol to a second communication protocol;

transmitting the message from the first relay computing device to a second relay computing device distinct from the first relay computing device via a communication mode according to the second communication protocol;

translating, by the second relay computing device, the message from the second communication protocol to a third communication protocol; and sending, by the second relay computing device, the message to a second endpoint according to the third communication protocol.

2. The method of claim 1, wherein the second communication protocol comprises a quantum-secure channel.

3. The method of claim 2, wherein the second communication protocol comprises a Quantum Secure Layer (QSL) protocol or a Post-Quantum Transport Layer Security (PQTLS) protocol.

4. The method of claim 1, wherein the first communication protocol or the third communication protocol comprises at least one of:

a Quantum Secure Layer (QSL) protocol;

a Post-Quantum Transport Layer Security (PQTLS) protocol;

Transport Layer Security (TLS) version 1.2;

TLS version 1.3;

a subsequent TLS version;

IMAP4;

IMAP2bis;

IMAP2;

another IMAP version;

Hypertext Transfer Protocol (HTTP);

Hypertext Transfer Protocol Secure (HTTPS);

another secure protocol;

a hybrid protocol; or unsecured communication.

5. The method of claim 1, wherein the communication mode comprises at least one of:

a network;

wireless communication;

radio frequency communication;

a communication line; or free-space optical communication.

6. The method of claim 1, wherein the communication mode is unsecured.

7. The method of claim 1, wherein translating the message from the first communication protocol to the second communication protocol comprises:

decrypting the message according to the first communication protocol; and encrypting the message according to the second communication protocol.

8. The method of claim 1, wherein translating the message from the second communication protocol to the third communication protocol comprises:

decrypting the message according to the second communication protocol; and encrypting the message according to the third communication protocol.

9. The method of claim 1, wherein translating the message from the first communication protocol to the second communication protocol is performed by a first relay computing device, and translating the message from the second communication protocol to the third communication protocol is performed by a second relay computing device.

10. The method of claim 9, wherein transmitting the message is performed from the first relay computing device to the second relay computing device.

11. A relay computing system configured to communicate securely, the relay computing system comprising:

a memory; and at least one processor coupled to the memory and configured to:

receive a message according to a first communication protocol;

translate the message from the first communication protocol to a second communication protocol; and transmit the message from the relay computing system to a second relay computing system distinct from the relay computing system via a communication mode according to the second communication protocol, wherein the second relay computing system is configured to:

receive the message according to the second communication protocol;

translate the message from the second communication protocol to a third communication protocol; and send the message according to the third communication protocol.

12. The relay computing system of claim 11, wherein the second communication protocol comprises a quantum-secure channel.

13. The relay computing system of claim 12, wherein the second communication protocol comprises a Quantum Secure Layer (QSL) protocol or a Post-Quantum Transport Layer Security (PQTLS) protocol.

14. The relay computing system of claim 11, wherein the first communication protocol or the third communication protocol comprises at least one of:

a Quantum Secure Layer (QSL) protocol;

a Post-Quantum Transport Layer Security (PQTLS) protocol;

Transport Layer Security (TLS) version 1.2;

TLS version 1.3;

a subsequent TLS version;

IMAP4;

IMAP2bis;

IMAP2;

another IMAP version;

Hypertext Transfer Protocol (HTTP);

Hypertext Transfer Protocol Secure (HTTPS);

another secure protocol;
a hybrid protocol; or
unsecured communication.

15. The relay computing system of claim 11, wherein the communication mode comprises at least one of:
a network;
wireless communication;
radio frequency communication;
a communication line; or
free-space optical communication.

16. The relay computing system of claim 11, wherein the communication mode is unsecured.

17. The relay computing system of claim 11, wherein the at least one processor is further configured to:
decrypt the message according to the first communication protocol; and
encrypt the message according to the second communication protocol.

18. The relay computing system of claim 11, wherein the second relay computing system is further configured to:
decrypt the message according to the second communication protocol; and
encrypt the message according to the third communication protocol.

19. A non-transitory computer readable medium storing executable sequences of instructions to communicate securely, the executable sequences of instructions comprising instructions to:
receive a message according to a first communication protocol;
translate the message from the first communication protocol to a second communication protocol; and
transmit the message from a first relay computing system to a second relay computing system distinct from the first relay computing system according to the second communication protocol, wherein the second relay computing system is configured to:
receive the message according to the second communication protocol;
translate the message from the second communication protocol to a third communication protocol; and
send the message according to the third communication protocol.

20. The non-transitory computer readable medium of claim 19, wherein the second communication protocol comprises a quantum-secure channel.

* * * * *